US012664100B2

(12) United States Patent
Yoo et al.

(10) Patent No.: US 12,664,100 B2
(45) Date of Patent: Jun. 23, 2026

(54) APPLICATION PROCESSOR, SYSTEM-ON-A-CHIP AND METHOD OF OPERATION THEREOF

(71) Applicant: SAMSUNG ELECTRONICS CO., LTD., Suwon-si (KR)

(72) Inventors: Junhee Yoo, Suwon-si (KR); Seunghun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 18/473,917

(22) Filed: Sep. 25, 2023

(65) Prior Publication Data

US 2024/0111686 A1      Apr. 4, 2024

(30) Foreign Application Priority Data

Sep. 29, 2022      (KR) ........................ 10-2022-0124557
Apr. 13, 2023      (KR) ........................ 10-2023-0048985

(51) Int. Cl.
*G06F 12/1009*            (2016.01)
*G06F 12/14*              (2006.01)

(52) U.S. Cl.
CPC ...... *G06F 12/1009* (2013.01); *G06F 12/1408* (2013.01); *G06F 12/1425* (2013.01)

(58) Field of Classification Search
None
See application file for complete search history.

(56) References Cited

U.S. PATENT DOCUMENTS

| | | | |
|---|---|---|---|
| 5,898,859 | A | 4/1999 | Kardach et al. |
| 8,898,429 | B2 | 11/2014 | Cho et al. |
| 9,274,974 | B1 | 3/2016 | Chen et al. |
| 9,547,603 | B2 | 1/2017 | Basu et al. |
| 9,880,940 | B2 | 1/2018 | Kim et al. |

(Continued)

FOREIGN PATENT DOCUMENTS

| | | |
|---|---|---|
| KR | 10-2021-0025683 | 3/2021 |
| KR | 10-2022-0041937 | 4/2022 |
| KR | 10-2022-0054389 | 5/2022 |

OTHER PUBLICATIONS

EESR issued Feb. 19, 2024 in corresponding Application No. EP Patent Application No. 23199777.6.

*Primary Examiner* — Ryan Bertram
*Assistant Examiner* — Edmund H Kwong
(74) *Attorney, Agent, or Firm* — Morgan, Lewis & Bockius LLP

(57) ABSTRACT

An application processor, a System-on-a-Chip (SoC), and a method of operating the same are provided. The SoC includes a first processor outputting a first access address, a system bus configured to transmit an access address to a memory if the access address, which is received from the first processor corresponds to a physical address area of the memory, and to transmit the access address to other processing circuits other than the memory if the access address corresponds to a shadow physical address area other than the physical address area of the memory, and a sub-processing circuit receiving the first access address from the first processor via the system bus, converting the first access address into a second access address corresponding to the physical address area, and transmitting the second access address to the system bus to access the memory.

19 Claims, 23 Drawing Sheets

(56)                 References Cited

U.S. PATENT DOCUMENTS

| | | | |
|---|---|---|---|
| 10,282,309 B2 * | 5/2019 | Jayasena | G06F 12/0607 |
| 10,387,325 B2 | 8/2019 | Yang | |
| 10,492,863 B2 | 12/2019 | Grace et al. | |
| 11,061,820 B2 | 7/2021 | Speier | |
| 11,494,311 B2 | 11/2022 | Bradshaw et al. | |
| 2015/0363329 A1 | 12/2015 | Precourt et al. | |
| 2016/0275016 A1 * | 9/2016 | Mukherjee | G06F 12/1054 |
| 2016/0283428 A1 | 9/2016 | Guddeti | |
| 2020/0242264 A1 * | 7/2020 | Hajnoczi | G06F 12/1009 |
| 2021/0157741 A1 | 5/2021 | Wallach | |
| 2021/0279334 A1 * | 9/2021 | Kim | G06F 15/7807 |
| 2021/0365386 A1 | 11/2021 | Evans | |
| 2022/0180467 A1 * | 6/2022 | Koker | G06F 9/30079 |
| 2023/0298128 A1 * | 9/2023 | Puffer | G06T 1/60 |
| | | | 345/520 |

* cited by examiner

FIG. 2A

EPAS

EFFECTIVE PHYSICAL ADDRESS SPACE

SPAS

SHADOW PHYSICAL ADDRESS SPACE

PGTB

PAGE TABLE

| VA | PA |
|-----|-----|
| PN0 | FN7 |
| PN1 | FN8 |
| PN2 | FN1 |
| . . . | . . . |
| PNn-1 | FNn-1 |
| PNn | FNn |

VAS

VIRTUAL ADDRESS SPACE

FIG. 11B

```
// compressed buffer allocation                    CD1
comp_buf_o0 = newBuffer (args)
comp_buf_o1 = newBuffer (args)
```

```
// payload and header virtual addresses are
// comp_buf_o0 [0] : first payload
// comp_buf_o0 [payload_size] : second payload
// comp_buf_o0 [image_size] : first header
```

```
// call a solution function – ERROR                 CD2
// the function cannot read the compressed buffers
foo_sol (comp_buf_o0, comp_buf_o1)
```

FIG. 12B

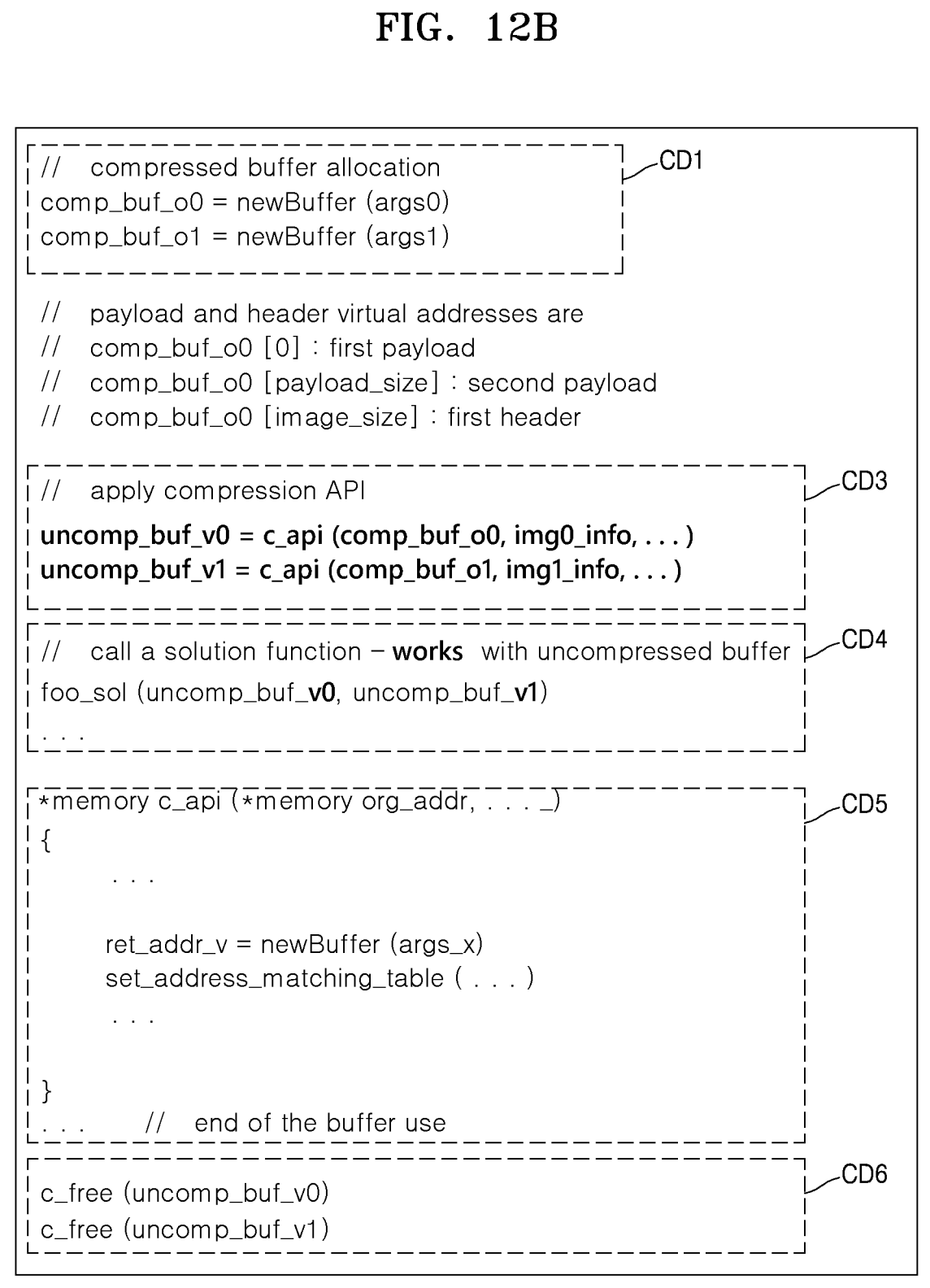

```
//   compressed buffer allocation                      CD1
comp_buf_o0 = newBuffer (args0)
comp_buf_o1 = newBuffer (args1)
```

```
//   payload and header virtual addresses are
//   comp_buf_o0 [0] : first payload
//   comp_buf_o0 [payload_size] : second payload
//   comp_buf_o0 [image_size] : first header
```

```
//   apply compression API                             CD3
uncomp_buf_v0 = c_api (comp_buf_o0, img0_info, ...)
uncomp_buf_v1 = c_api (comp_buf_o1, img1_info, ...)
```

```
//   call a solution function - works  with uncompressed buffer   CD4
foo_sol (uncomp_buf_v0, uncomp_buf_v1)
. . .
```

```
*memory c_api (*memory org_addr, . . . _)              CD5
{
        . . .

ret_addr_v = newBuffer (args_x)
        set_address_matching_table ( . . . )

. . .

}
. . .        //   end of the buffer use
```

```
c_free (uncomp_buf_v0)                                 CD6
c_free (uncomp_buf_v1)
```

(Address Matching Table)

| SPAS | VA$_{CB}$ | VA$_{HD}$ | IF_IMG (width, heigh, format) |
|------|-----------|-----------|-------------------------------|
| shadow_p0 | comp_buf_o0 | comp_buf_o0+img0_size | 3840, 2160, NV12 |
| shadow_p1 | comp_buf_o1 | comp_buf_o1+img1_size | 3840, 2160, NV12 |

AMT

APPLICATION PROCESSOR, SYSTEM-ON-A-CHIP AND METHOD OF OPERATION THEREOF

CROSS-REFERENCE TO RELATED APPLICATION

This application claims priority under 35 U.S.C. § 119 to Korean Patent Application No. 10-2022-0124557, filed on Sep. 29, 2022 in the Korean Intellectual Property Office (KIPO), and to Korean Patent Application No. 10-2023-0048985, filed on Apr. 13, 2023 in the KIPO, the disclosures of which are incorporated by reference herein in their entireties.

FIELD

The inventive concept generally relates to a System-on-a-Chip (SoC), and more particularly relates to an SoC including a sub-processing circuit for supporting an application executed by a processor, an application, and a method of operating the SoC.

DISCUSSION

A System-on-a-Chip (SoC) embodies technology integrating complex systems with various functions into a single semiconductor chip. There is a converging trend of integrating computers, communications, and broadcasting. Uses for an application specific integrated circuit (ASIC) and an application specific standard product (ASSP) are each shifting to SoC technology. In addition, miniaturization and weight reduction of information technology (IT) devices are driving SoC-related businesses.

As mobile applications develop, the use of processors and memory is increasing. Thus, a new SoC may be desired for supporting the usage of service software for users while minimizing the increase in processor and memory usage within limited power consumption design specifications.

SUMMARY

Embodiments of the inventive concept may provide a System-on-a-Chip (SoC) and/or application processor for distinguishing and processing memory requests from software.

According to an embodiment of the inventive concept, there is provided a System-on-a-Chip (SoC) including a first processor configured to output a first access address; a system bus configured to transmit the first access address to a memory if the first access address corresponds to a physical address area of the memory, and to transmit the first access address to other processing circuits other than the memory if the first access address corresponds to a shadow physical address area other than the physical address area of the memory; and a sub-processing circuit configured to receive the first access address from the first processor via the system bus, convert the first access address into a second access address corresponding to the physical address area, and transmit the second access address to the system bus to access the memory.

According to an embodiment of the inventive concept, there is provided an application processor including a main processor configured to convert a first virtual address, which is generated as an application is executed, into a first physical address by using a first page table including mapping information between a physical address, which indicates one of a physical address area and a shadow physical address area of a memory, and a virtual address, which indicates an address area of a virtual memory recognized by the application, and to output a first access request including the first physical address; a router configured to receive the first access request from the main processor, transmit the first access request to the memory in response to the first physical address corresponding to the physical address area of the memory, and output the first access request to an intellectual property (IP) core other than the memory in response to the first physical address corresponding to the shadow physical address area of the memory; a sub-processing circuit configured to receive the first access request from the router, process data related to the first access request, and convert the first physical address into a second virtual address; and a first memory management unit (MMU) configured to convert the second virtual address into a second physical address corresponding to the physical address area of the memory, wherein the router is configured to receive a second access request including the second physical address from the first MMU, and to transmit the second access request to the memory if the second physical address corresponds to the physical address area of the memory.

According to an embodiment of the inventive concept, there is provided a method of operating a System-on-a-Chip (SoC), the method including transmitting, by a processor, a first access request signal including a first physical address to a router; transmitting, by the router, the first access request signal to a sub-processing circuit if the first physical address does not correspond to a physical address area of a memory; converting, by the sub-processing circuit, the first physical address into a second physical address corresponding to the physical address area of the memory; transmitting, by the sub-processing circuit, a second access request signal including the second physical address to the router; and transmitting, by the router, the second access request signal to the memory.

BRIEF DESCRIPTION OF THE DRAWINGS

Embodiments will be more clearly understood from the following detailed description taken in conjunction with the accompanying drawings in which:

FIGS. 2A and 2B are hybrid tabular diagrams, the former illustrating a page table according to an embodiment, and the latter illustrating address areas according to an embodiment;

FIGS. 11A and 11B are hybrid tabular diagrams, the former illustrating matching between a virtual address space and an effective physical address space according to a comparative example, and the latter illustrating a result of memory access according to the comparative example;

FIGS. 12A and 12B are hybrid tabular diagrams, the former illustrating an address matching between a virtual address space and a physical address space, according to an embodiment, and the latter illustrating matching between a virtual address space and a physical address space based on an application programming interface (API), according to an embodiment;

FIG. 13 is a block diagram illustrating an application processor according to an embodiment;

FIG. 15 is a tabular diagram illustrating an example of an address matching table according to an embodiment;

DETAILED DESCRIPTION

Figure 1:
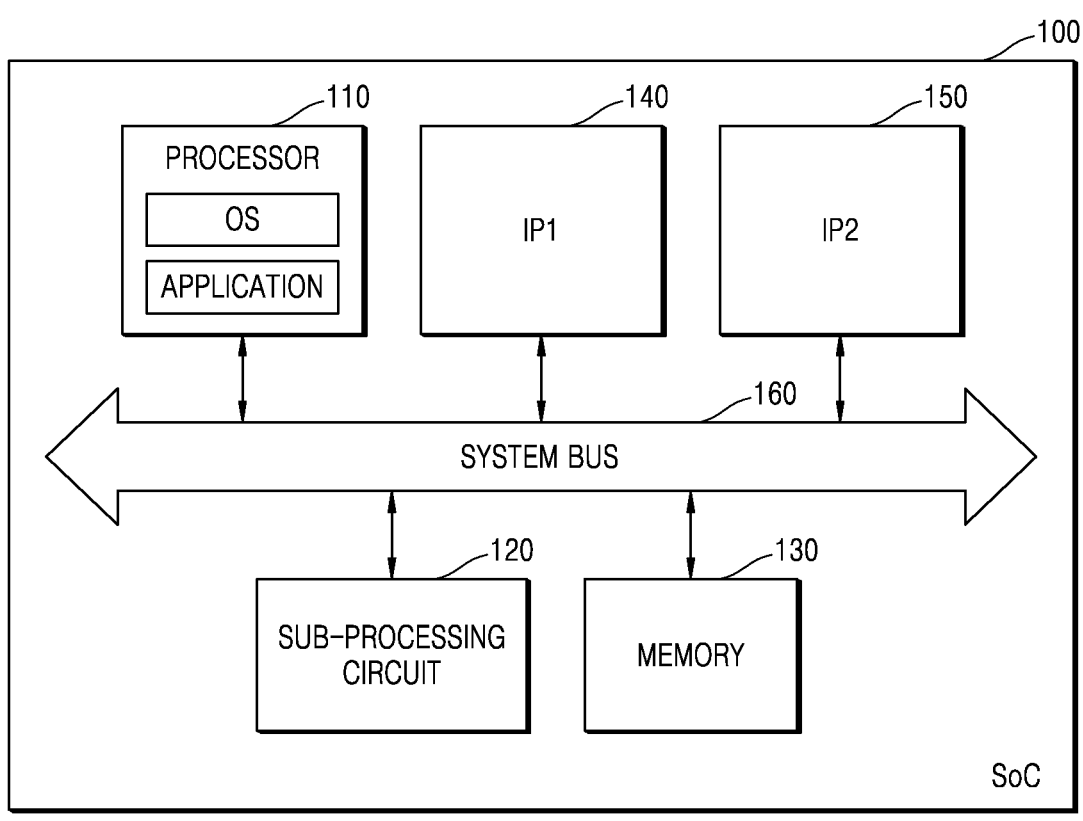
FIG. 1 is a block diagram illustrating a System-on-a-Chip (SoC) according to an embodiment.

Hereinafter, the inventive concept is described in detail by way of non-limiting embodiments with reference to the accompanying drawings. The components described by referring to terms such as parts or units, modules, blocks, or the like used in the detailed description and the functional blocks illustrated in the drawings may be implemented in the form of software, hardware, or a combination thereof. For example, the software may be machine code, firmware, embedded code, and/or application software. For example, the hardware may include electrical circuits, electronic circuits, processors, computers, integrated circuits, integrated circuit cores, pressure sensors, inertial sensors, microelectromechanical systems (MEMS), passive devices, and/or a combination thereof.

FIG. 1 illustrates a System-on-a-Chip (SoC) according to an embodiment.

A SoC 100 may be mounted on an electronic device, and for example, the electronic device may include a mobile device such as a smartphone, a tablet, a personal computer (PC), a personal digital assistant (PDA), a portable multimedia player (PMP), a laptop computer, a wearable device, a global positioning system (GPS) device, an electronic book terminal, a digital broadcast terminal, an MP3 player, a digital camera, a wearable computer, a navigation system, a drone, or the like. For example, the electronic device may also include an internet of things (IoT) device, a home appliance, and/or an advanced driver assistance system (ADAS). The SoC 100 may include a controller and a processor that controls an operation of the electronic device. The SoC 100 may refer to an application processor (AP), a mobile AP, and/or a control chip.

The SoC 100 may be mounted in an electronic device such as a camera, a smartphone, a wearable device, an internet of things (IoT) device, a home appliance, a tablet PC, a PDA, a PMP, a navigation system, a drone, an ADAS, or the like.

In addition, the SoC 100 may be mounted on electronic devices equipped as components in vehicles, furniture, manufacturing facilities, doors, and various measurement devices.

Referring to FIG. 1, the SoC 100 may include a processor 110, a sub-processing circuit 120, a memory 130, intellectual property cores (IPs) such as IP1 140 and/or IP2 150, and a system bus 160. The SoC 100 may further include a communications function module, an image sensor module, or the like. The components of the SoC 100, such as the sub-processing circuit 120, the memory 130, and the IPs 140 and 150 may transmit and receive data via the system bus 160.

The processor 110 may be a main processor of the SoC 100, and may control an overall operation of the SoC 100. The processor 110 may run an operating system (OS) and execute various applications (application software) of the electronic device on which the SoC 100 is mounted. The processor 110 may process various types of arithmetic operations and/or logical operations, for example. The processor 110 may include a single processor core (single core) or multiple processor cores (multi-core). The processor 110 may include cache memories used for each of one or more processor cores to perform various operations. Cache memories may temporarily store instructions and/or parameter values used for the processor 110 to execute an application.

The processor 110 may store data in the memory 130 or read data from the memory 130 in a process of executing an operating system and applications. For example, the application may read data from the memory 130, process the read data, and store the processed data back into the memory 130. The processor 110 may send an access request for reading or writing to the memory 130 to read data from the memory 130 and write the processed data to the memory 130, and the access request may include a physical address indicating an area in which data is stored or to be written among storage areas of the memory 130.

The application may read data from a virtual address space, which is provided in a virtual space, or write data into the virtual address space, and the processor 110 may convert, such as by using a page table (e.g., PGTB in FIG. 2A), a virtual address (which may be referred to as a logical address) indicating a virtual address space into a physical address indicating one of multiple address areas of an effective physical address space of the memory 130 in which data is stored or to be stored.

In an embodiment, the page table may be used to map the virtual address to either an effective physical address space of the memory 130, that is, a physical address representing one of address areas included in an actual physical address space, or a physical address indicating one of address areas deviating from the effective physical address space (e.g., shadow physical address space). Hereinafter, the physical address corresponding to the effective physical address space of the memory 130 is referred to as an 'effective physical address', and the physical address corresponding to a shadow physical address space is referred to as a 'shadow physical address'.

Figure 2B:
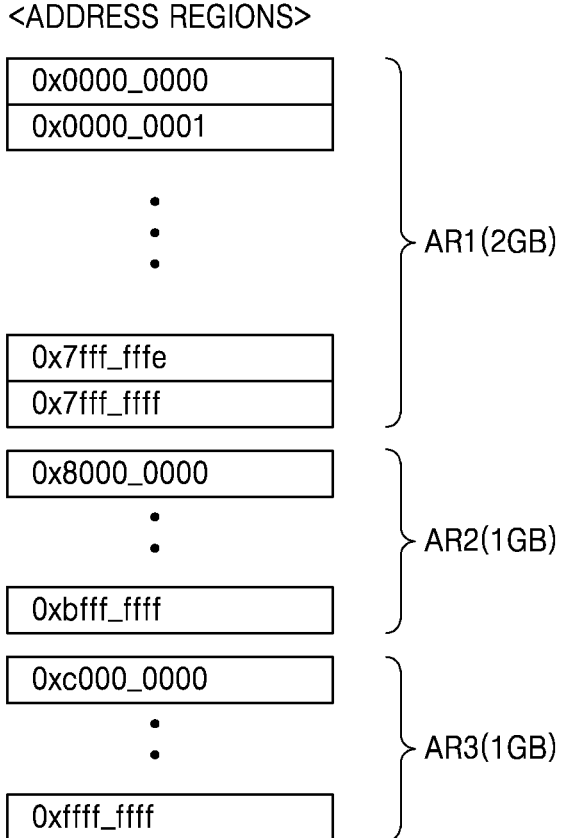

FIG. 2A illustrates a page table according to an embodiment, and FIG. 2B illustrates address areas according to an embodiment.

Referring to FIG. 2A, a page table PGTB may include a virtual address VA and a physical address PA. The virtual address VA may indicate address areas of the virtual address space VAS, and the physical address PA may indicate corresponding address areas of an effective physical address space EPAS and corresponding address areas of a shadow physical address space SPAS. The virtual address space VAS may include an address space provided by a virtual memory technology and may be recognized by the operating system and the applications executing in the processor (110 in FIG. 1). The effective physical address space EPAS may have the same size as a system memory, such as, for example, the memory 130, without limitation thereto. The shadow physical address space SPAS may include an area outside of the system memory.

Referring to FIG. 2B, when the memory 130 has a capacity of 2 gigabytes (GB) and the SoC 100 is a 32-bit system, the address area may include a first address area AR1 with 2 GB and an address of 0x0000_0000 to 0x7fff_ffff, a second address area AR2 with 1 GB and an address of 0x8000_0000 to 0xbfff_ffff, and a third address area AR3 with 1 GB and an address of 0xc000_0000 to 0xffff_ffff. The first address area AR1 may be set as the effective physical address space EPAS, and one of the address areas outside the first address area AR1, such as, for example, the third address area AR3, may be set as the shadow physical address space SPAS.

In an embodiment, the virtual address space VAS may be divided into a pages (e.g., PN0 to PNn, where n is an integer of 3 or more), and each of the pages PN0 to PNn may be an address area indicated by the virtual address VA. A size of each page PN0 to PNn may be 4 KB, but is not limited thereto.

The effective physical address space EPAS and the shadow physical address space SPAS may be divided into frames FN0 to FNn, and the physical address PA corresponding to the virtual address VA may indicate the frames FN0 to FNn. Some of the frames FN0 to FNn may be provided as address areas of the effective physical address space EPAS (hereinafter referred to as an effective physical address area), and others may be provided as address areas of the shadow physical address space SPAS (hereinafter referred to as a shadow physical address area). For example, frames FN1, FN7, and FN8 in FIG. 2A may be effective physical address areas, and frames FNn−1 and FNn may be shadow physical address areas. Among the physical addresses PA, an effective physical address may indicate one of the effective physical address areas, such as frames FN1, FN7, or FN8, and a shadow physical address may indicate one of the shadow physical address areas, such as frames FNn−1 or FNn.

The virtual addresses VA of the page table PGTB may sequentially correspond to the pages PN0 to PNn, and the physical addresses PA mapped to the virtual addresses VA may sequentially or non-sequentially correspond to the frames FN0 to FNn. The connection between the virtual addresses VA and the physical addresses PA may not be permanent and may be disconnected or adjusted according to various events.

Referring back to FIG. 1, when accessing the memory 130, the processor 110 may generate, as an access address, an effective physical address or a shadow physical address mapped to the virtual address, based on the page table PGTB in FIG. 2A, and may output an access request having the access address, to the system bus 160. The processor 110 may have direct access to the memory 130 based on the effective physical address. In addition, the processor 110 may have indirect access to the memory 130 via the sub-processing circuit 120 based on the shadow physical address. The indirect access to the memory 130 may be described below in greater detail with reference to FIGS. 4A to 15.

The sub-processing circuit 120 may support a function that the processor 110 does not provide, such as, for example, data processing, for data to be read by the application from the memory 130 or data to be written into the memory 130. The sub-processing circuit 120 may convert the shadow physical address into the effective physical address indicating the physical address area of the memory 130, and read data from the memory 130 based on the effective physical address. The sub-processing circuit 120 may process data and transmit the processed data to the processor 110. In addition, the sub-processing circuit 120 may process data requested by the processor 110 for writing together with the shadow physical address, convert the shadow physical address into the effective physical address, and write (store) the processed data into the memory 130 based on the effective physical address.

In an embodiment, the sub-processing circuit 120 may include a compressor and decompressor and may compress or decompress received data. When the data that is stored in the memory 130 that is to be read by the application is compressed data, even though the data is read from the memory 130, the application might not be able to use the data unless the processor 110 provides a decompression function. The sub-processing circuit 120 may read data from the memory 130 based on the shadow physical address and decompress the read data, and transmit the decompressed data to the processor 110. Moreover, the sub-processing circuit 120 may compress the data provided from the processor 110 together with the shadow physical address and write (store) the compressed data into the memory 130.

In an embodiment, the sub-processing circuit 120 may include an encoder and decoder and may encrypt or decrypt the received data. For example, the sub-processing circuit 120 may encrypt data provided from the processor 110, such as data that is requested to be written to the memory 130 by the application, before storing the data in the memory 130. By encrypting the data before storing the data into the memory 130, the data may be protected from attacks such as cold-boot attacks. Since the encryption and decryption processing of the sub-processing circuit 120 is a process separated from the operation of the processor 110, performance degradation of the application caused by the security function need not occur in executing the application, and the power efficiency may be optimized by using dedicated hardware versus when the security function is provided by the processor 110.

In an embodiment, the sub-processing circuit 120 may pre-fetch data that is expected to be accessed by the processor 110, such as through a separate channel to which a cache coherence protocol is applied between the system bus 160 and the sub-processing circuit 120.

The memory 130 may temporarily store data that is processed or to be processed by the processor 110, the sub-processing circuit 120, and the IPs 140 and 150. The memory 130 may include a volatile memory such as a dynamic random-access memory (DRAM), a static RAM (SRAM), a synchronous RAM (SDRAM), and/or a non-volatile memory such as a phase-change RAM (PRAM), a magneto-resistive RAM (MRAM), a ferroelectric RAM (FRAM), or the like. However, for ease of description, it may be assumed here that DRAM is used as the memory 130, without limitation thereto. In FIG. 1, the memory 130 is illustrated to be mounted in the SoC 100, but it is not limited thereto. For example, the memory 130 may be implemented as a separate chip from the SoC 100, and may transmit and receive data to and from other components of the SoC 100.

The memory 130 may be a system memory. An operating system (OS), applications, and/or firmware may be loaded in the memory 130 in booting. For example, when an electronic device equipped with the SoC 100 is booted, an OS image stored in a storage space may be loaded into the memory 130 according to a boot sequence. Overall input/output operations of the SoC 100 may be supported by the operating system OS. Moreover, applications and/or firmware (e.g., related to graphics processing) may be loaded into the memory 130 according to a user's selection and/or basic services.

Each of the IPs 140 and 150 may include a unit module or a combination of unit modules designed to perform a specific function in the SoC 100. An IP may be referred to as a functional module or a processing circuit. The IPs 140 and 150, such as, for example, a first IP 140 and a second IP 150, may include a graphics processing unit (GPU), an image signal processor (ISP), a digital signal processor (DSP), a power management unit (PMU), a clock management unit (CMU), a universal serial bus (USB) controller, a peripheral component interconnect (PCI) controller, a wireless interface, a generic controller, embedded software, a codec, a video module such as a camera interface, a joint photographic experts group (JPEG) processor, a video processor, a mixer, or the like, a 3-dimensional graphics core, an audio system, and/or a driver. The IPs 140 and 150 may be implemented in hardware, software or firmware, or any combination thereof. In FIG. 1, the processor 110 and the sub-processing circuit 120 are illustrated in a separate configuration from the IPs 140 and 150, but the processor 110 and/or the sub-processing circuit 120 may also be referred to as IP.

The system bus 160 may connect the components of the SoC 100 to one another, such as the processor 110, the sub-processing circuit 120, the memory 130, and the IPs 140 and 150, and may provide a transmission path for data or signals between the components.

In an embodiment, the system bus 160 may be implemented in a network-on-a-chip (NoC) method. The NoC method is a method of connecting processing circuits in a semiconductor chip by applying packet or circuit network technology between general computers or communications devices, to a semiconductor chip. The system bus 160 may include a router and a switching circuit to provide a transmission path for data and signals between the processing circuits in the SoC, such as between the processor 110, the sub-processing circuit 120, the memory 130, and the IPs 140 and 150.

In an embodiment, the system bus 160 may be implemented in the form of an NoC to which a protocol having a preset standard bus specification is applied. For example, an advanced microcontroller bus architecture (AMBA) protocol of an advanced Reduced Instruction Set Computer (RISC) machine (ARM) protocol may be applied as the standard bus specification. The bus types of the AMBA protocol may include one or more of an advanced high-performance bus (AHB), an advanced peripheral bus (APB), an advanced extensible interface (AXI), an AXI4, AXI coherency extensions (ACE), or the like. Among the bus types described above, the AXI is an interface protocol between functional blocks that provides a multiple outstanding address function and a data interleaving function. In addition, other types of protocols, such as Sonics Inc.'s uNetwork, IBM's CoreConnect, and/or the OCP-IP's Open Core Protocol may also be applied to the system bus 160.

The system bus 160 may receive an access request from at least one component of the SoC 100, such as, for example, the processor 110, the sub-processing circuit 120, the first IP 140, and the second IP 150, and may transmit, based on a physical address included in the access request such as an access address, the access request to a component having a corresponding physical address, such as, for example, the memory 130. In addition, the system bus 160 may transmit a response to the access request to the component that provided the access request.

In the SoC 100 according to an embodiment, when the physical address in the access request is received from the processor 110, such as when the access address is an effective physical address, the system bus 160 may transmit the access request to the memory 130. Accordingly, the processor 110 may have direct access to the memory 130 based on the effective physical address. As used herein, 'direct access' to the memory 130 means that the memory access is performed without any processing circuits and includes access through the system bus 160.

When the physical address is a shadow physical address, the system bus 160 may transmit the access request to the sub-processing circuit 120. As described above, the sub-processing circuit 120 may convert the shadow physical address into the effective physical address. The system bus 160 may receive an access request including an effective physical address from the sub-processing circuit 120 and transmit the access request to the memory 130. Accordingly, the processor 110 may have indirect access to the memory 130 via the sub-processing circuit 120 based on the shadow physical address. As used herein, 'indirect access' to the memory 130 means the memory access is performed through a processing circuit, such as via the sub-processing circuit 120.

As described above, in the SoC 100 according to an embodiment, the page table PGTB in FIG. 2A may include an effective physical address corresponding to the physical address area and a shadow physical address corresponding to the shadow physical address area, which is an address space other than the physical address area, and the processor 110 may have direct access to the memory 130 through the system bus 160 or may have indirect access to the memory 130 through the system bus 160 and the sub-processing circuit 120. In executing the application, the sub-processing circuit 120 may provide functions that are not provided by the processor 110, such as, for example, a compression/decompression function, and/or an encryption/decryption function, without limitation thereto. Accordingly, the SoC 100 may support various applications without any modifications to the processor 110 and/or any load increase to the processor 110. In addition, the usage bandwidth of the memory 130 may be reduced by the compression/decompression function, to thereby optimize performance of the SoC 100 and/or minimize power consumption of the SoC 100.

Figure 3:
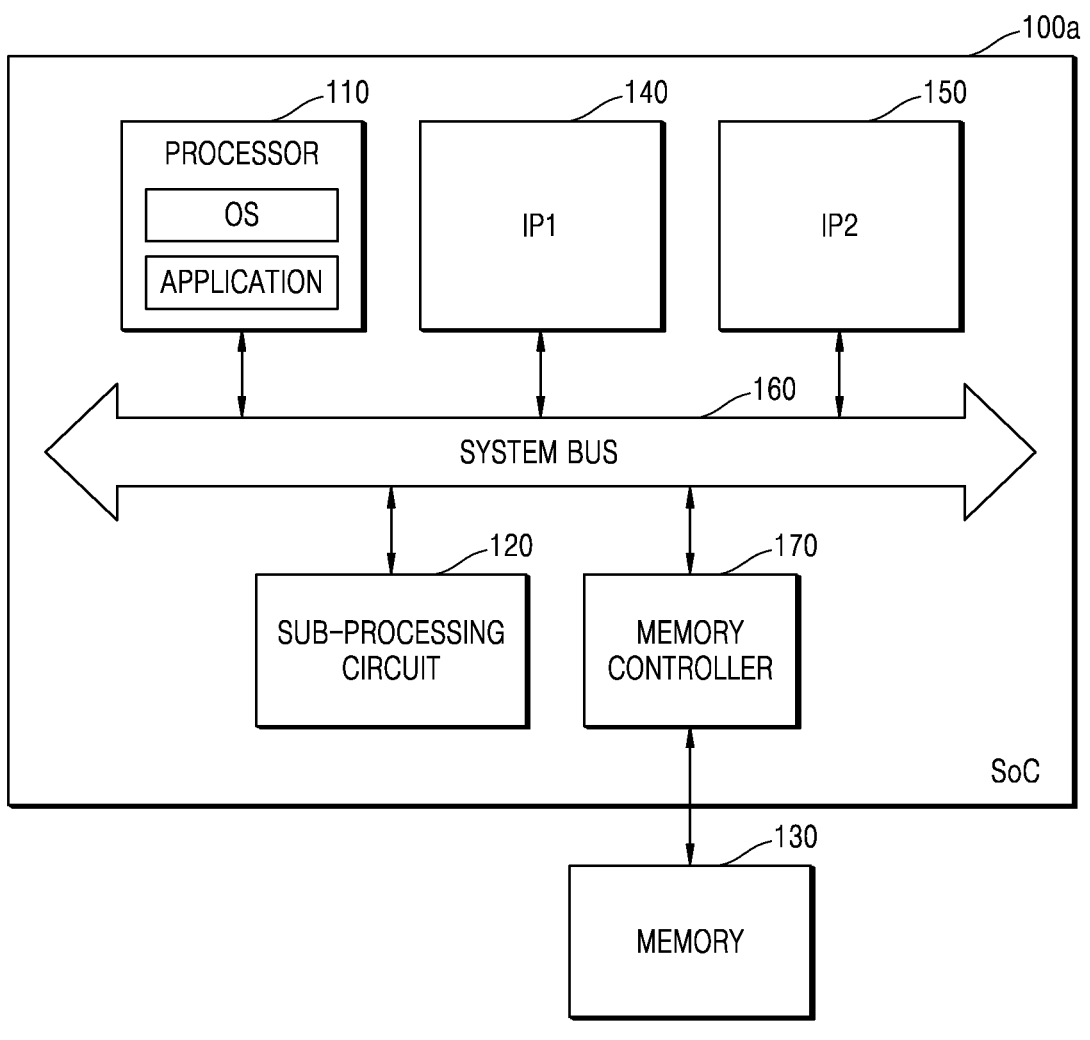
FIG. 3 is a block diagram schematically showing a SoC according to an embodiment.

FIG. 3 shows a SoC according to an embodiment.

Referring to FIG. 3, a SoC 100a according to an embodiment may include the processor 110, the sub-processing circuit 120, IPs 140 and 150, the system bus 160, and a memory controller 170. The SoC 100a shown in FIG. 3 is a modified example of the SoC 100 shown in FIG. 1. Accordingly, substantially duplicate description may be omitted.

In an embodiment, the memory 130 may be implemented as a separate chip outside of the SoC 100a. The memory 130 may include a system memory. Moreover, various types of memories that may be applied to the memory 130 in FIG. 1 may be applied to the memory 130.

The memory controller 170 may receive an access request including an access address from the system bus 160, and transmit the access request to the memory 130. In addition, the memory controller 170 may transmit a processing result and/or a response to the access request to the system bus 160.

Figure 4A:
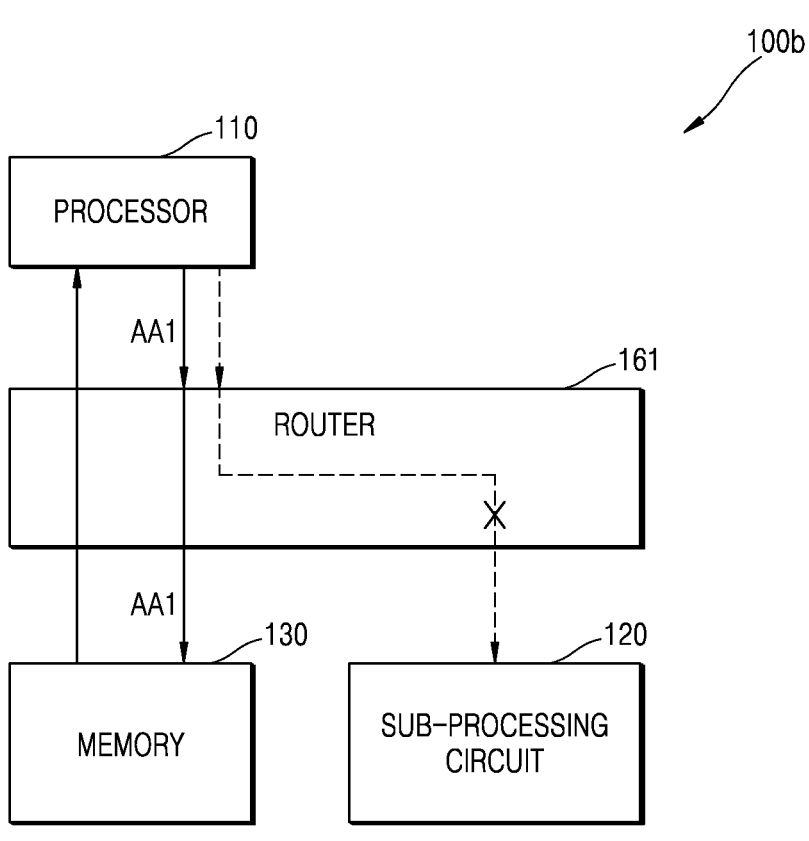
FIGS. 4A and 4B are block diagrams illustrating a path through which the processor has access to the memory in the SoC, according to an embodiment.
Figure 4B:
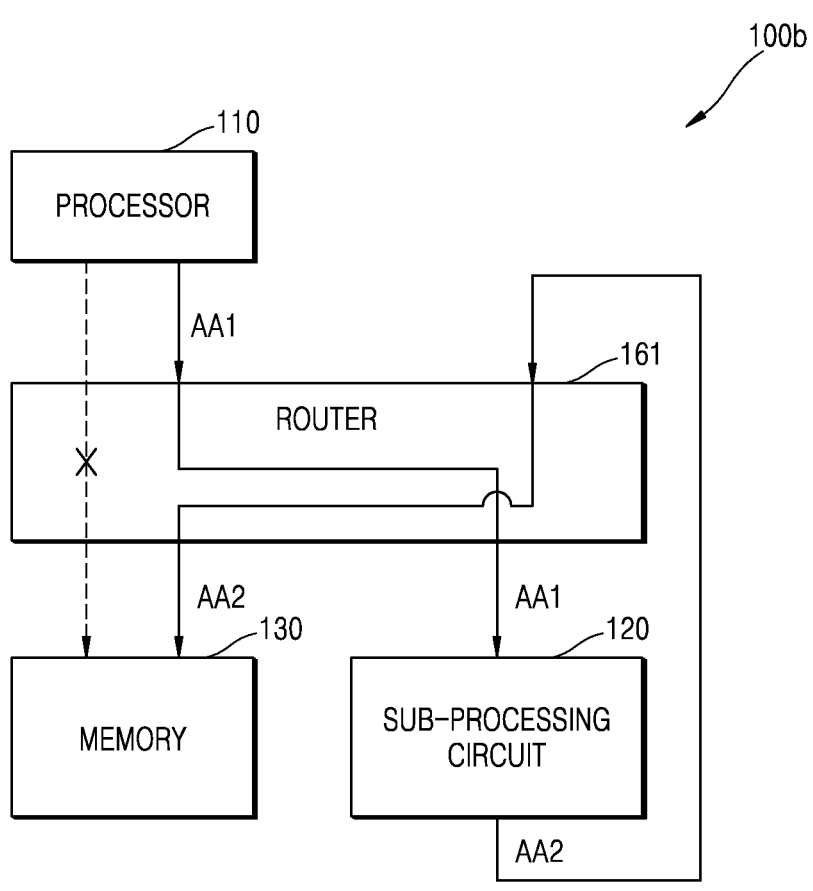
Figure 5:
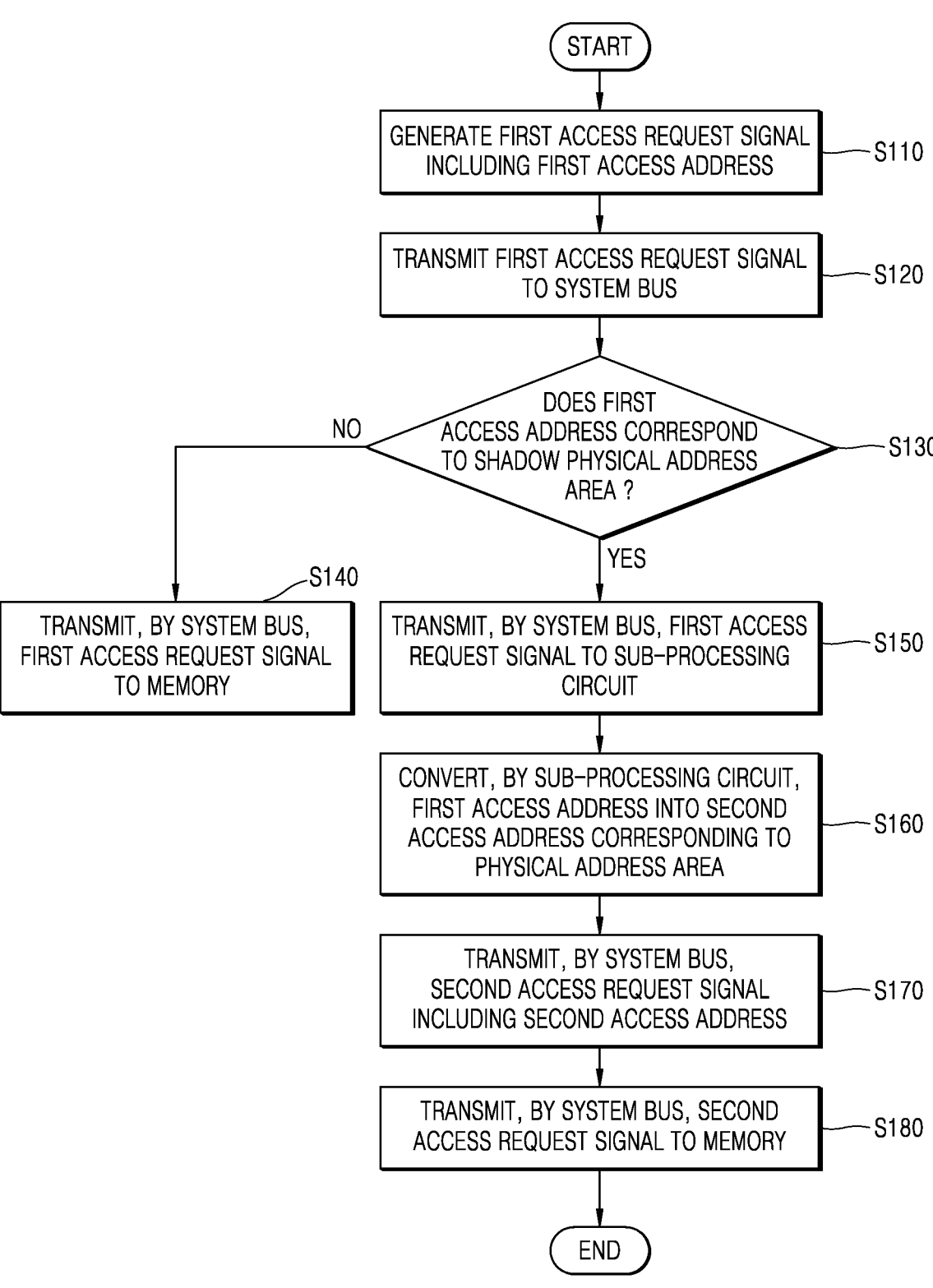
FIG. 5 is a flowchart diagram showing a method of having access to the memory by the processor in the SoC, according to an embodiment.

FIGS. 4A and 4B illustrate a path through which the processor has access to the memory in a SoC 100b according to an embodiment, and FIG. 5 shows a method of providing access to the memory from the processor in the SoC 100b according to an embodiment.

Referring to FIGS. 4A and 4B, the SoC 100b may include the processor 110, the sub-processing circuit 120, the memory 130, and a router 161. The router 161 may be arranged in the system bus 160 of FIG. 1. The SoC 100b may further include other components described with reference to FIG. 1. For example, the memory 130 is shown to be provided in the SoC 100b, but is not limited thereto. As described with reference to FIG. 3, the memory 130 may be implemented as a separate chip outside of the SoC 100b. In this case, the SoC 100b may further include the memory controller 170 of FIG. 3 that provides a communications path with the memory 130.

Referring to FIG. 5, the processor 110 may generate a first access request signal including a first access address at step S110. The processor 110 may execute an application and operate a page table (e.g., PGTB of FIG. 2A) corresponding to the application according to an embodiment. The processor 110 may convert the virtual address VA of FIG. 2A, which is issued by the application for an access of the memory 130, into the physical address PA of FIG. 2A by using the page table PGTB of FIG. 2A. In this case, the physical address PA may include the effective physical address and the shadow physical address. The processor 110 may generate a first access request signal including the effective physical address or the shadow physical address as a first access address AA1.

The processor 110 may transmit the first access request signal (e.g., a write request command or a read request command) for the memory 130 including the first access address AA1 to the system bus 160 of FIG. 1 at step S120. The first access request signal may be transmitted to the router 161 on the system bus 160.

The router 161 may determine whether the first access address AA1 corresponds to the shadow physical address area at step S130. The router 161 may include information about the shadow physical address corresponding to the shadow physical address area and determine whether the first access address is the shadow physical address based on the information about the shadow physical address.

When determining that the first access address AA1 does not correspond to the shadow physical address area EPAS, the router 161 may transmit the first access request signal via the system bus to the memory at step S140. The router 161 may transmit the received access address to the memory 130 or to the sub-processing circuit 120.

When determining that the first access address AA1 corresponds to the physical address area EPAS of FIG. 2A, the router 161 may transmit the first access address AA1 to the memory 130, such as shown in FIG. 4A. For example, when the first access address AA1 corresponds to the effective physical address, the router 161 may transmit the first access address AA1 to the memory 130.

When determining that the first access address AA1 corresponds to the shadow physical address area SPAS of FIG. 2A, the router 161 may transmit the first access request signal to the sub-processing circuit 120 at step S150. When the first access address AA1 is determined to correspond to the shadow physical address area, such as when the first access address AA1 is determined to correspond to the shadow address area, the router 161 may transmit the first access address AA1 to the sub-processing circuit 120 rather than the memory 130 as shown in FIG. 4B. For example, when the first access address AA1 corresponds to the shadow physical address, the router 161 may transmit the first access address AA1 to the sub-processing circuit 120. The operations below are described with reference to FIGS. 4B and 5.

The sub-processing circuit 120 may convert the first access address AA1 into a second access address AA2 corresponding to the physical address area at step S160. For example, the sub-processing circuit 120 may convert the first access address AA1, which is the shadow physical address, into the second access address AA2, which is the effective physical address.

The sub-processing circuit 120 may transmit a second access request signal including the second access address AA2 to the system bus 160 at step S170. For example, the sub-processing circuit 120 may output the second access address AA2 to the router 161.

The system bus 160 may transmit the second access request signal to the memory 130 at step S180. As described above for operation S130, the router 161 may determine whether the received access address corresponds to the shadow physical address area. Here, since the second access address AA2 is the effective physical address, it does not correspond to the shadow physical address area. Accordingly, the router 161 may transmit the second access address AA2 to the memory 130.

In the SoC 100b according to this embodiment, the processor 110 may have direct access to the memory 130 based on the effective physical address, and have indirect access to the memory 130 via the sub-processing circuit 120 based on the shadow physical address.

Figure 6:
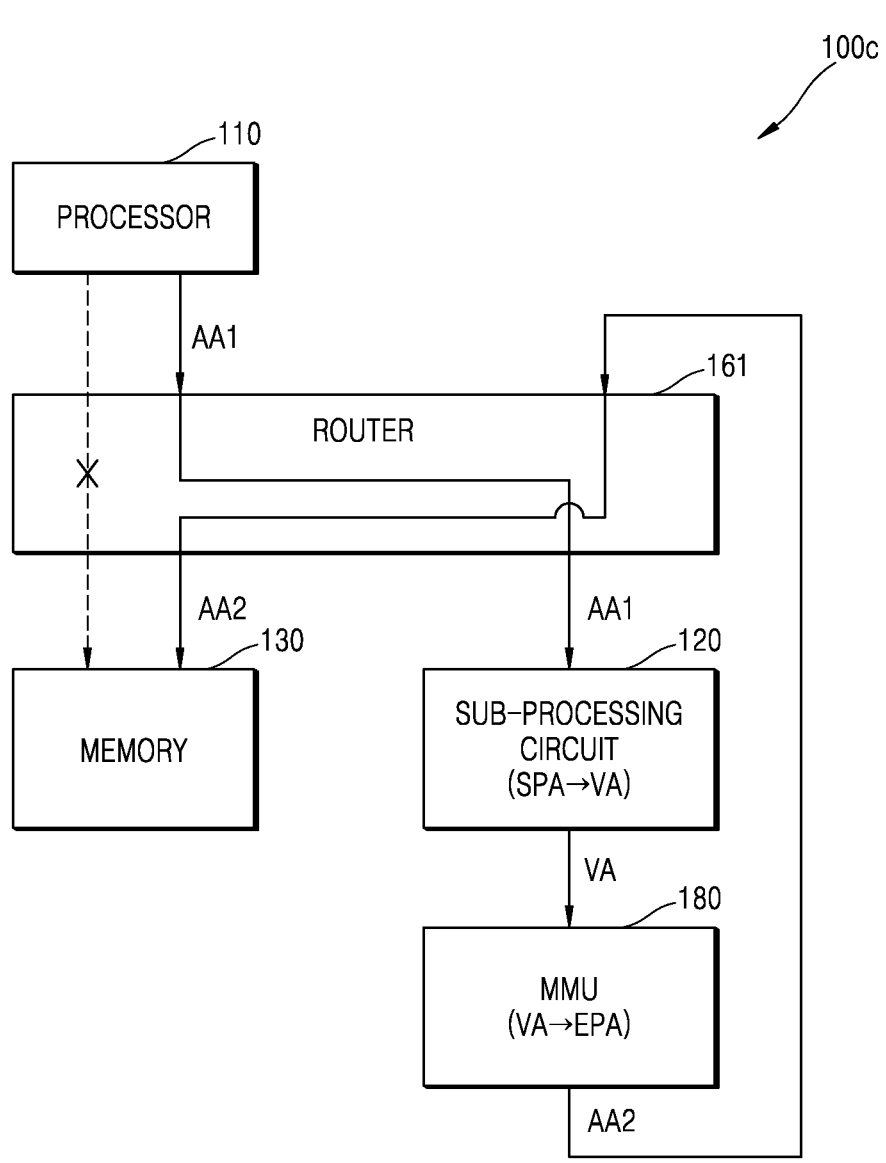
FIG. 6 is a block diagram illustrating an operation of a SoC, according to an embodiment.

FIG. 6 illustrates an operation of a SoC 100c according to an embodiment.

Referring to FIG. 6, the SoC 100c according to this embodiment may include the processor 110, the sub-processing circuit 120, the memory 130, the router 161, and a memory management unit (MMU) 180. The SoC 100c of FIG. 6 is a modified example of the SoC 100b in FIGS. 4A and 4B, and thus, any further detailed descriptions on the same elements are omitted and the descriptions on the SoC 100c are focused on the differences.

As described above, when the first access address AA1 included in the first access request signal generated by the processor 110 is included in the shadow physical address area, such as when the first access address AA1 is a shadow physical address SPA, the router 161 may transmit the first access request signal to the sub-processing circuit 120.

The sub-processing circuit 120 may convert the first access address AA1 from the shadow physical address SPA into a virtual address VA. In an embodiment, the sub-processing circuit 120 may include an address matching table having mapping information for the virtual address VA corresponding to the shadow physical address SPA. Thus, the sub-processing circuit 120 may convert the shadow physical address SPA into the virtual address VA by using the address matching table. Accordingly, the sub-processing circuit 120 may convert the first access address AA1, such as the shadow physical address SPA, into the virtual address VA.

The MMU 180 may convert the virtual address VA, received from the sub-processing circuit 120, into an effective physical address EPA. In an embodiment, the MMU 180 may include a page table having mapping information for the effective physical address EPA corresponding to the virtual address VA. The page table used by the MMU 180 may be different from the page table used by the processor 110. For example, the MMU 180 may include a system MMU that supports one or more processing circuits of the SoC 100c, and the page table may be the same as another page table used by at least one other processing circuit of the SoC 100c, such as by the graphics processing unit (GPU), the image signal processor (ISP), or the like, without limitation thereto.

The MMU 180 may generate a second access request including the effective physical address EPA as the second access address AA2, and transmit the second access request to the router 161. The router 161, in turn, may transmit the second access request to the memory 130.

Figure 7:
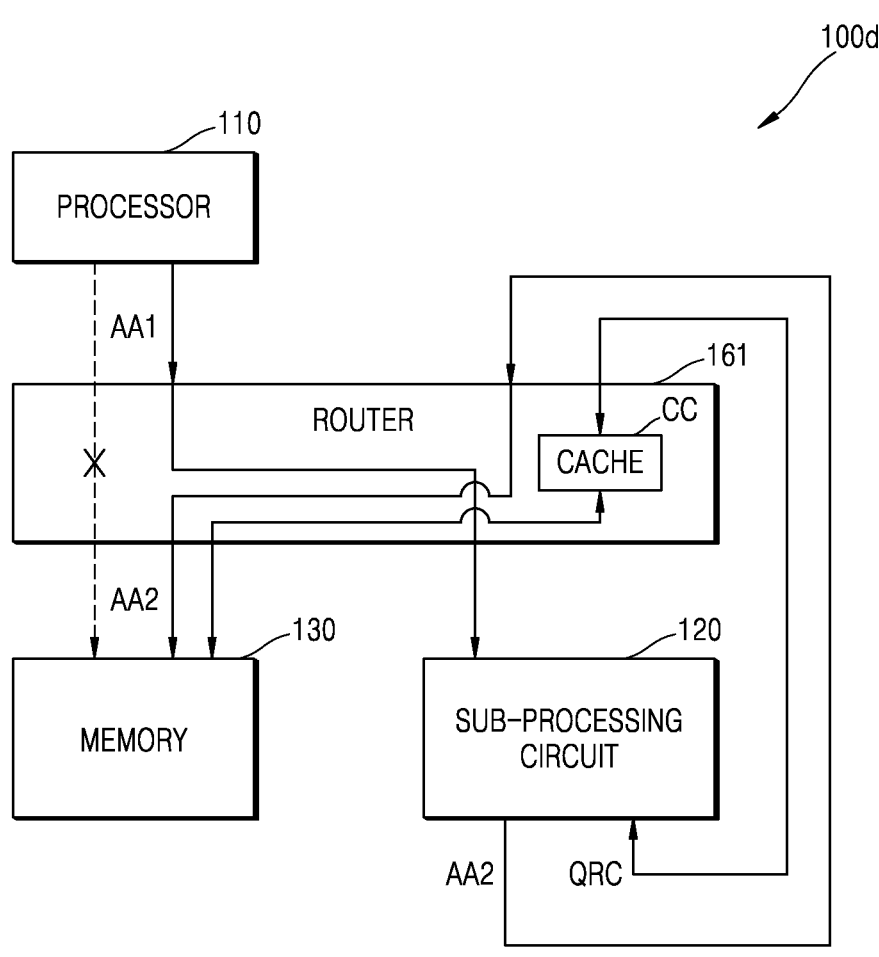
FIG. 7 is a block diagram illustrating an operation of the SoC, according to an embodiment.

FIG. 7 illustrates an operation of the SoC 100d according to an embodiment.

Referring to FIG. 7, the SoC 100d according to an embodiment may include the processor 110, the sub-processing circuit 120, the memory 130, and the router 161. The SoC 100d of FIG. 7 is a modified example of the SoC 100b of FIG. 4B. Substantially duplicate description may be omitted.

In an embodiment, the router 161 may include a cache CC. An additional channel may be provided for managing the cache CC between the sub-processing circuit 120 and the router 161, and the sub-processing circuit 120 may transmit a cache management request signal QRC, such as a read command, a stash command, or the like destined for the cache CC to the router 161 in response to a cache coherence protocol.

Here, the router 161 may operate as a cache coherency controller. The router 161 may store data in the cache CC or read out stored data from the cache CC in response to the cache management request signal QRC from the sub-processing circuit 120. The router 161 may provide a path through which the data stored in the memory 130 is read from and/or written into the cache CC. The router 161 may be configured to maintain consistency between the cache CC and at least one cache of the processor 110, such as but not limited to local caches and/or shared caches in the processor 110, or between the cache CC and at least one cache of the sub-processing circuit 120, such as but not limited to local caches and/or shared caches in the sub-processing circuit 120.

In an embodiment, the cache CC is shown to be inside the router 161, but is not limited thereto. For example, the cache CC may be separately placed outside the router 161, such as in the system bus 160 of FIG. 1, or may be a shared cache between at least one processor.

The sub-processing circuit 120 may pre-fetch data, such as data which is expected to be used by the processor 110, in the cache CC in response to the cache management request signal QRC. The sub-processing circuit 120 may support a data pre-fetch in a form that the processor 110 need not support. Accordingly, performance may be optimized when the processor 110 executes the application.

In an embodiment, with reference to FIGS. 6 and 7, the SoC 100d may further include the MMU 180 of FIG. 6. In this case, the sub-processing circuit 120 may directly transmit the cache management request signal QRC, such as a read command, a stash command, or the like, to the router 161. The router 161, in turn, may transmit a response to the cache management request signal QRC, such as cache hit or miss status and relevant data in response to the read request, to the sub-processing circuit 120.

Figure 8A:
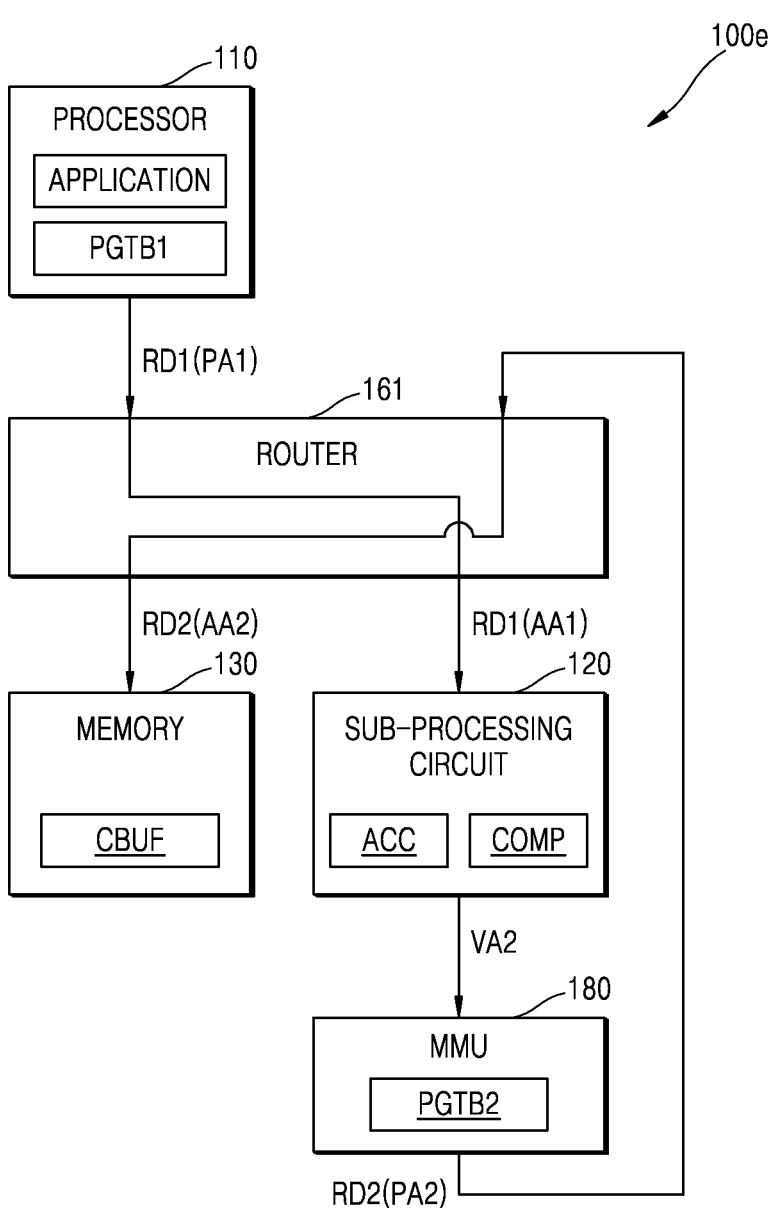
FIGS. 8A and 8B are block diagrams illustrating a read operation of the SoC, according to an embodiment.
Figure 8B:
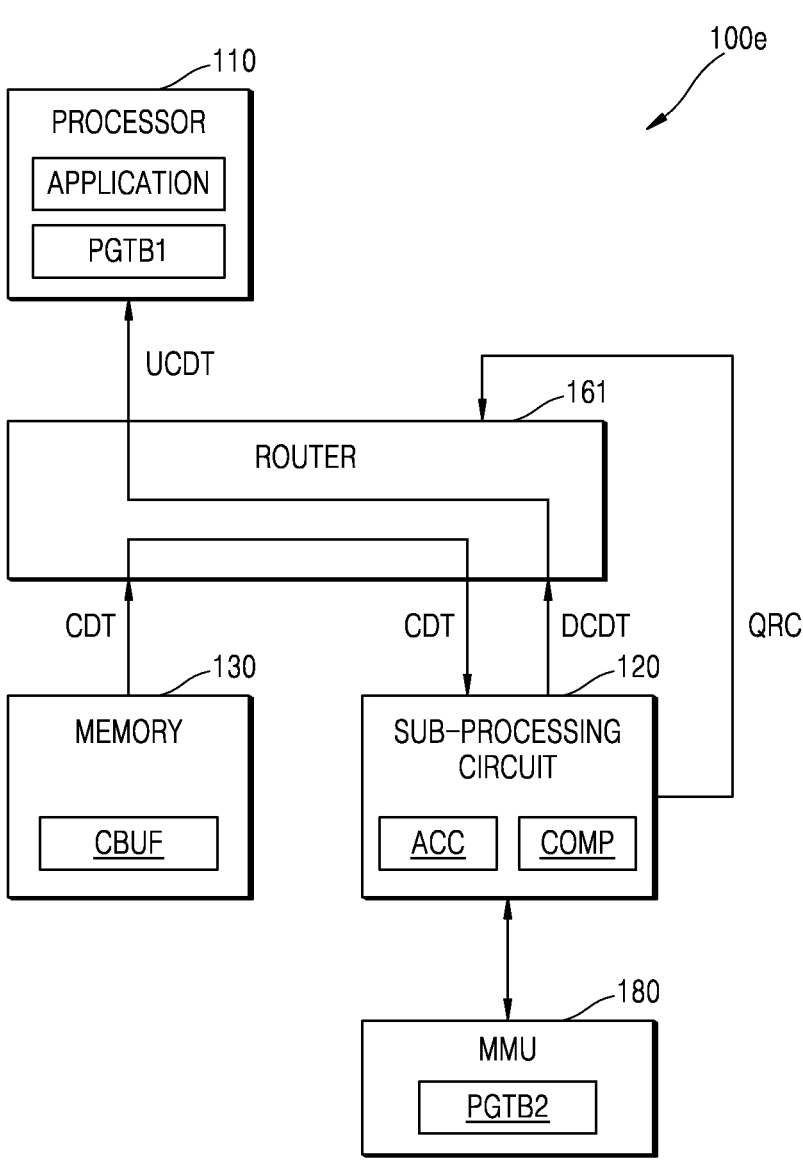

FIGS. 8A and 8B illustrate a read operation of a SoC 100e according to an embodiment. Compressed image data may be stored in the memory 130 in FIGS. 8A and 8B. In an embodiment the compressed image data may be read out by the sub-processing circuit 120 performing the indirect access to the memory 130 in response to an image data read request from the processor 110.

Referring to FIG. 8A, the processor 110 may execute an application for performing an image processing operation, such as but not limited to face recognition and correction, image quality improvement, or the like. The application may request to read out image data from the memory 130, and may generate a first virtual address indicating an area in which the image data is stored.

The processor 110 may convert the first virtual address into a first physical address PA1 based on a first page table PGTB1 set for the application. The first page table PGTB1 may be used to map the virtual address to the effective physical address or the shadow physical address, such as described above with reference to FIGS. 2A and 2B. The first physical address PA1 may be a shadow physical address.

The memory 130 may include a compression buffer CBUF, and compressed image data CDT such as in FIG. 7B may be stored in the compression buffer CBUF.

Figure 9:
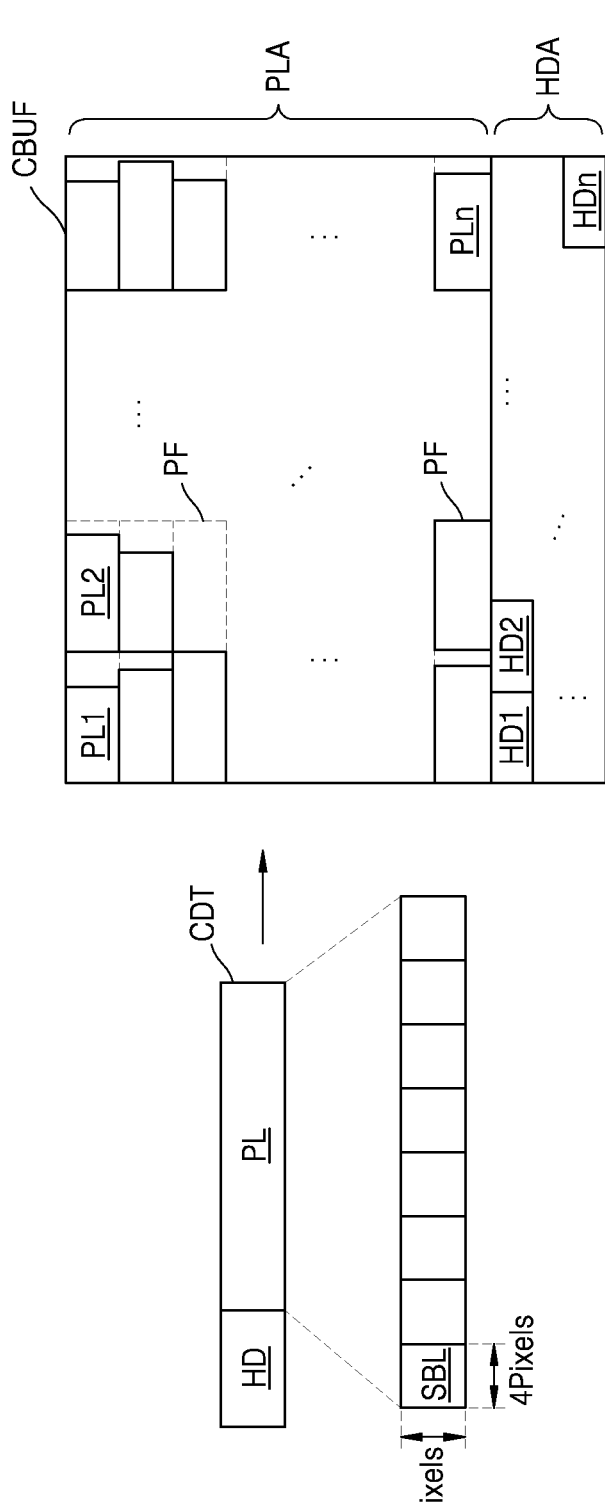
FIG. 9 is a hybrid block diagram illustrating compressed image data stored in the compression buffer, according to an embodiment.

FIG. 9 illustrates compressed image data CDT stored in the compression buffer CBUF, according to an embodiment.

An image processing circuit, such as but not limited to an Image Signal Processor (ISP), may compress image data by the sub-block SBL. For example, the sub-block SBL may include 16 pixels arranged in a 4×4 matrix. A packet of the compressed image data CDT may include a header HD and a payload PL. The payload PL may include sub-blocks SBL that are compressed therein. The header HD may include information about the storage order and storage size of the compressed sub-blocks SBL, which may be compressed individually or as a group and arranged in the payload PL. The header information may further include a start address of the payload PL, such as but not limited to a start address of a first sub-block.

The compression buffer CBUF may include a payload area PLA with n payloads PL stored therein, where n is a positive integer of two (2) or more, and a header area HDA, with n headers HD stored therein. A footprint PF of substantially the same size may be set for each payload PL. Accordingly, the start address and/or end address of the payload PL may be recognized according to the order of the payloads PL.

For example, the ISP may compress the original image data received from the image sensor per sub-block and store the compressed image data CDT in the compression buffer CBUF. The ISP may store the compressed image data CDT in the effective physical address generated based on a second page table PGTB2 set for the ISP, where the effective physical address corresponds to an area of the compression buffer CBUF to which the compressed image data CDT is to be stored.

Referring to FIGS. 8A and 9, the processor 110 need not provide a compression and/or decompression function for an application. In such a case, when the processor 110 itself reads out the compressed image data CDT from the memory 130, the application might not be able to use the compressed image data CDT. Accordingly, the processor 110 may control the sub-processing circuit 120 such as to decompress the compressed image data CDT, and receive the decompressed image data from the sub-processing circuit 120.

Therefore, the processor 110 may convert the first virtual address into the shadow physical address, rather than the effective physical address, by using the first page table PGTB1, and generate a first read request signal RD1, including the first physical address PA1 corresponding to the shadow physical address, as the access address.

In such a case where the first physical address PA1 received from the processor 110 corresponds to the shadow physical address area rather than the physical address area of the memory 130, the router 161 may transmit the first read request signal RD1 of FIG. 8a to the sub-processing circuit 120 instead of to the memory 130.

The sub-processing circuit 120 may include an address conversion circuit ACC that converts a physical address into a virtual address. In an embodiment, the address conversion circuit ACC may convert a physical address into a virtual address by using an address matching table. The address matching table may include the virtual address corresponding to the physical address of the payload PL, and the address conversion circuit ACC may include information on the image data, such as but without limitation to height, width, format of image data, or the like. The sub-processing circuit 120 may convert the first physical address PA1, which is included in the first read request signal RD1 received from the router 161, into a second virtual address VA2. In an embodiment, the address conversion circuit ACC may calculate the virtual address for each header HD and payload PL of the compressed image data CDT corresponding to the first physical address PA1, such as by using an address matching table.

The sub-processing circuit 120 may also include a compressor COMP. The compressor COMP may compress and/or decompress the received data, such as described below with reference to FIG. 8B, without limitation thereto.

The MMU 180 may convert the second virtual address VA2, received from the sub-processing circuit 120, into the second physical address PA2 by using the second page table PGTB2. The MMU 180 may transmit a second read request signal RD2 including the second physical address PA2 to the router 161. In an embodiment, the second page table PGTB2 may include a page table set for another processing circuit, such as but not limited to an ISP, for compressing the image data and storing the compressed image data CDT into the memory 130. Moreover, the second page table PGTB2 may map the effective physical address to the virtual address. The second physical address PA2 may be the effective physical address.

Here, since the second physical address PA2 corresponds to the physical address area of the memory 130, the router 161 may transmit the second read request signal RD2 to the memory 130.

Referring now to FIGS. 8B and 9, the compressed image data CDT may be read out from the second physical address PA2 in the compression buffer CBUF of the memory 130. The router 161 may transmit the compressed image data CDT to the sub-processing circuit 120. The compressor COMP of the sub-processing circuit 120 may decompress the compressed image data CDT. The sub-processing circuit 120 may transmit the decompressed image data DCDT to the processor 110 through the router 161.

The decompressed image data DCDT may include more than just the read image data requested by the processor 110, such as but not limited to pixel values for some pixels included in the image data of a single frame. Moreover, the sub-processing circuit 120 may transmit image data corresponding to the first physical address PA1, which is received from the processor 110, to the processor 110 among the decompressed image data DCDT.

In an embodiment, the sub-processing circuit 120 may include a cache CC such as but not limited to that described in detail with reference to FIG. 7. In response to the cache management request signal QRC received from the sub-processing circuit 120, the sub-processing circuit 120 may store remaining data of the decompressed image data DCDT in the cache, but need not store some of the decompressed image data DCDT transmitted to the processor 110. The processor 110 may be relatively likely to request reading of continuous image data in a single frame, without limitation thereto. Therefore, when the read image data requested by the processor 110 is stored in the cache, the sub-processing circuit 120 may transmit the image data stored in the cache CC to the processor 110 without further access to the memory 130.

Figure 10:
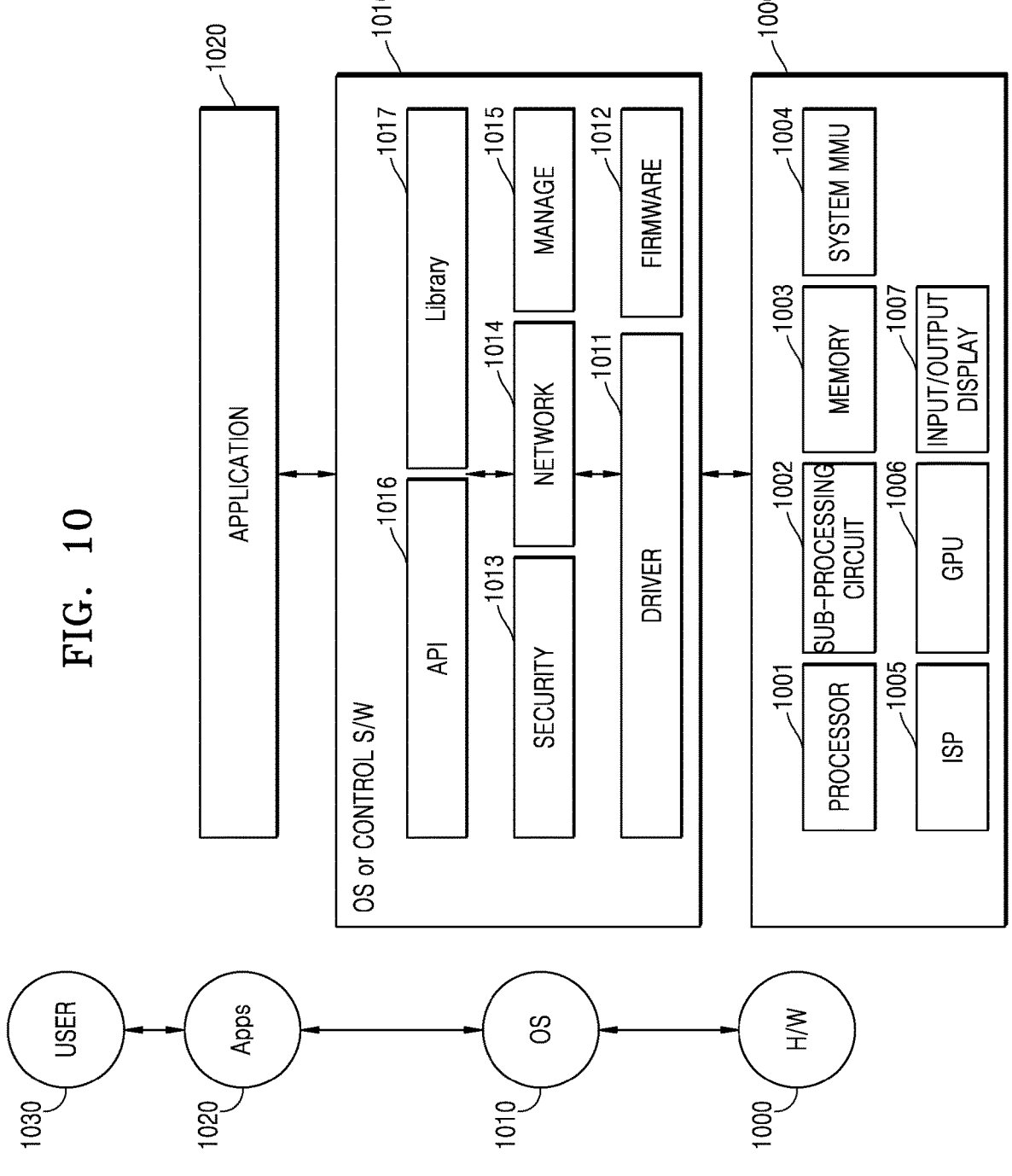
FIG. 10 is a hybrid block diagram illustrating a software layer of the SoC, according to an embodiment.

FIG. 10 illustrates a software layer of an SoC, such as but not limited to the SoC 100, according to an embodiment. For conveniences of description, hardware connected to the SoC 100 may be illustrated together as hardware (H/W) 1000 hereinafter.

An application 1020 and an OS 1010 may be performed by a processor, such as but not limited to the processor 110 of FIG. 1. The application 1020 refers to software (S/W) and/or a service for implementing a specific function. The user 1030 refers to an entity such as but not limited to a person, Artificial Intelligence (AI), or other system using the application 1020. The user 1030 may communicate with the application 1020 via the user interface UI. The application 1020 may be manufactured and/or configured based on each desired service, and may communicate with the user 1030 via the user interface suitable for each such service. The application 1020 may perform the operation requested by the user 1030, and may call the contents of an application protocol interface (API) 1016 and/or a library 1017 as desired.

The API 1016 and/or the library 1017 may perform macro operations responsible for specific functions, or provide interfaces when communications with the lower layers is desired. When the application 1020 requests the lower layer to operate through the API 1016 and/or the library 1017, the API 1016 and/or the library 1017 may classify the received requests into fields for security 1013, network 1014, and/or management 1015. The API 1016 and/or the library 1017 may operate a particular layer suitable for the requested field. For example, when the application 1020 requests a function related to the network 1014, the API 1016 may transmit a parameter for a layer of the network 1014 and call a related function. In this case, the network 1014 may communicate with a lower layer to perform the requested operation. When there is no corresponding lower layer, the API 1016 and/or the library 1017 itself may perform the corresponding operation, without limitation thereto.

A driver 1011 may manage the hardware 1000 of the SoC 100, for example, and check the operation states of the hardware 1000. When receiving a request classified by the upper layers, the driver 1011 may deliver the classified request to a corresponding layer of the hardware 1000.

When the driver 1011 delivers the request to the layer of the hardware 1000, firmware 1012 may convert the request into a form that is acceptable to the hardware 1000. The firmware 1012, for converting the request and transmitting the converted request to the hardware 1000, may be provided in the driver 1011 and/or in the hardware 1000.

For example, the SoC 100 of FIG. 1 may include an operating system (OS) 1010 for managing components of the SoC 100 including the API 1016, the driver 1011, and the firmware 1012. The OS 1010 may be stored in a non-volatile memory in the form of control command code and/or data.

The hardware 1000 may include a processor 1001, a sub-processing circuit 1002, a memory 1003, a system memory management unit (MMU) 1004, an image signal processor (ISP) 1005, a graphics processing unit (GPU) 1006, an input/output (I/O) display 1007, and/or the like. The hardware 1000 may execute the request or command delivered by the driver 1011 and the firmware 1012, in order and/or out of order, and store the execution results in a memory 1003, in a register inside the hardware 1000, or in a memory such as a dynamic random-access memory (DRAM) connected to the hardware 1000. The stored execution results may be returned to the driver 1011 and/or the firmware 1012.

The hardware 1000 may generate an interrupt to request a desired operation for the upper layer. When the interrupt is generated, the hardware 1000 may check the interrupt in the management field 1015 of the OS 1010, and may process the interrupt by communicating with the core of the hardware 1000.

In an embodiment, the API 1016 may set an environment in which the processor 1001, such as but not limited to the processor 110 of FIG. 1, may have indirect access to the memory 1003, such as but not limited to the memory 130 of FIG. 1, by using the sub-processing circuit 1002, such as but not limited to the sub-processing circuit 120 of FIG. 1. The API 1016 may generate a page table, such as but not limited to the page table PGTB of FIG. 2A and/or the first page table PGTB1 of FIG. 8A, corresponding to the application 1020 that uses the function of sub-processing circuit 1002, and set information for the operation of the sub-processing circuit 1002, such as the address matching table and/or the second page table PGTB2 of FIG. 8A.

Accordingly, when the application 1020 is executed by the processor 1001, the page table corresponding to the application 1020, the address matching table for the sub-processing circuit 1002, and the page table may be provided, and the processor 1001 may have access to the memory 1003 by using the sub-processing circuit 1002 based on the shadow physical address, such as described with reference to FIGS. 1 to 8B, supra.

In an embodiment, the API 1016 is shown to be provided in the OS or control software 1010, but is not limited thereto. For example, the API 1016 may be provided by the application 1020 depending on different design choice criteria of various embodiments.

Figure 11A:
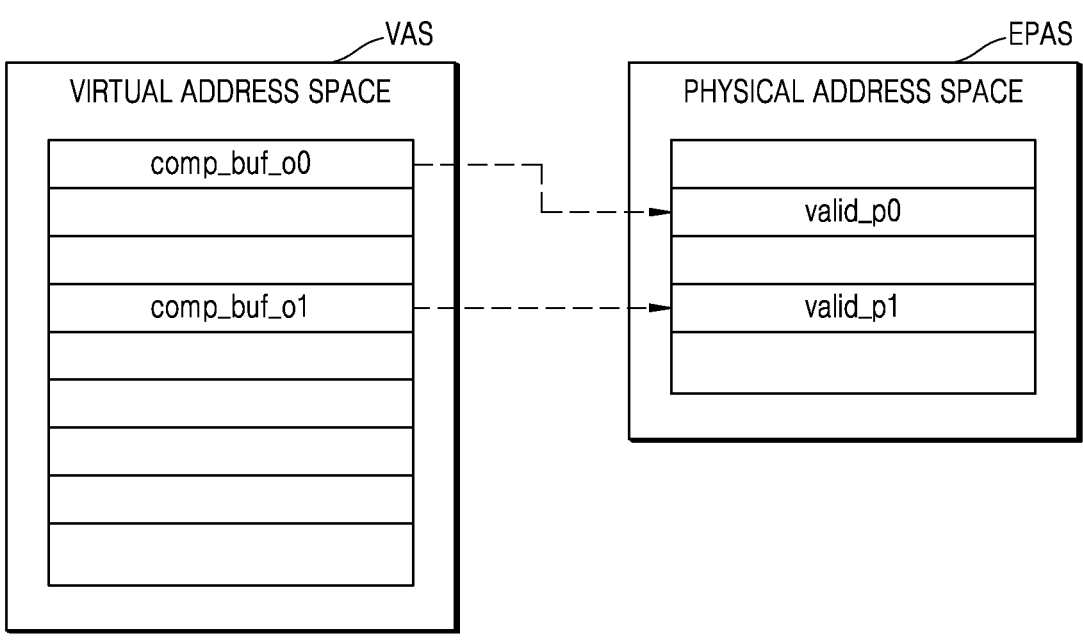

FIG. 11A illustrates matching between a virtual address space VAS and an effective physical address space EPAS according to a comparative example. FIG. 11B shows a result of memory access according to the comparative example.

Referring to FIG. 11A, the virtual address space VAS includes compressed buffers comp_buf_o0 and comp_buf_o1 as storage areas for applications. The compressed buffers comp_buf_o0 and comp_buf_o1 may match effective physical address areas valid_p0 and valid_p1 of the effective physical address space EPAS. The effective physical address areas valid_p0 and valid_p1 may be areas in the compression buffer of a memory, such as but not limited to the compression buffer CBUF of FIG. 8A and the memory 130 of FIG. 1.

Referring to FIG. 11B, code CD1 shows that the compressed buffers comp_buf_o0 and comp_buf_o1 are allocated to the virtual address space VAS. For example, the compressed buffers comp_buf_o0 and comp_buf_o1 may be allocated to the virtual address space VAS for a camera process. The first header of the virtual address corresponding to the compressed buffers comp_buf_o0 and comp_buf_o1 may indicate an image size, the first payload may be 0, and the second payload may indicate a size of the payload, without limitation thereto.

When an application requests data from the compressed buffers comp_buf_o0 and comp_buf_o1 based on a solution function foo_sol according to code CD2, a processor, such as the processor 110 of FIG. 1. may access the effective physical address areas valid_p0 and valid_p1 of a memory, such as the memory 130 as described with respect to any of the FIGS. 1-8B, to read out the compressed data stored in the effective physical address areas valid_p0 and valid_p1, such as described with reference to FIG. 4A. Moreover, even when data is read out from empty address areas such as caused by compression of the image data, or the compressed data is read out, the application might not be able to interpret the compressed data because the decompression function need not be provided by the processor 110.

Figure 12A:
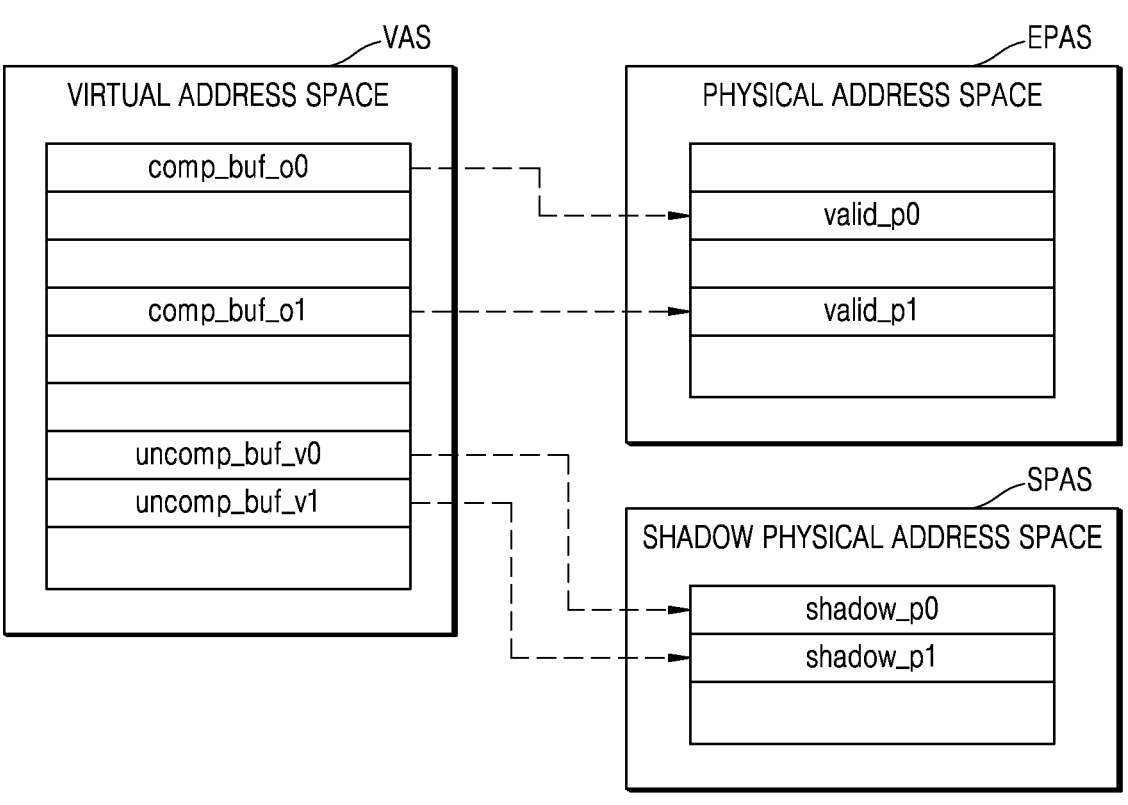

FIG. 12A illustrates matching between virtual and physical address spaces according to an embodiment. FIG. 12B illustrates matching between a virtual address space and a physical address space based on an API according to an embodiment.

Referring to FIG. 12A, the virtual address space VAS may include the compressed buffers comp_buf_o0 and comp_buf_o1 and uncompressed buffers uncomp_buf_v0 and uncomp_buf_v1 corresponding thereto. The compressed buffers comp_buf_o0 and comp_buf_o1 may match the effective physical address areas valid_p0 and valid_p1 of the effective physical address space EPAS, and the uncompressed buffers uncomp_buf_v0 and uncomp_buf_v1 may match the shadow physical address areas shadow_p0 and shadow_p1 of the shadow physical address space SPAS. The matching between the virtual address space VAS and the effective physical address space EPAS and the matching between the virtual address space and the shadow physical address space SPAS may be set by the API 1016 of FIG. 10, and the matching information may be generated as a page table (e.g., PGTB of FIG. 2A and PGTB1 of FIG. 8A).

Referring to FIG. 12B, the compressed buffers comp_buf_o0 and comp_buf_o1 may be allocated to the virtual address space VAS according to code CD1 such as described above for FIG. 12A. Substantially duplicate description may be omitted.

Code CD3 shows that a compression API is applied to allocate the uncompressed buffers uncomp_buf_v0 and uncomp_buf_v1 to the virtual address space VAS. Accordingly, the compression API may provide an uncompressed view to the processor 110 of FIG. 1. A function c_api of the compression API may generate the uncompressed buffers uncomp_buf_v0 and uncomp_buf_v1 based on the compressed buffers comp_buf_o0 and comp_buf_o1, image information, and/or the like. For example, the uncompressed buffers uncomp_buf_v0 and uncomp_buf_v1 may be set as virtual address space of the operating system (OS), or as temporary virtual address space of the application for the processor 110 to have access to the uncompressed buffers uncomp_buf_v0 and uncomp_buf_v1.

When the data in the uncompressed buffers uncomp_buf_v0 and uncomp_buf_v1 is requested based on the solution function 'foo_sol' according to code CD4, a memory function of the compression API, such as '*memory c_api', may map the uncompressed buffers uncomp_buf_v0 and uncomp_buf_v1 to the shadow physical address areas shadow_p0 and shadow_p1, and generate the page table such as described in code CD5. In addition, the memory function of the compression API may generate a matching table that is used in the sub-processing circuit 120 of FIG. 1. Here, the shadow physical address areas shadow_p0 and shadow_p1, corresponding to the uncompressed buffers uncomp_buf_v0 and uncomp_buf_v1, are to be continuously allocated in the shadow physical address space SPAS. For example, a value obtained by adding a buffer size, which is a size of each shadow physical address area, to a start address indicating a start area 'shadow_p0' among the shadow physical address areas, may be calculated as an end address indicating a last area such as 'shadow_p1' among the shadow physical address areas.

For example, the processor 110 may indirectly read out the decompressed data from the compression buffer CBUF in the memory 130 of FIG. 1 corresponding to the compressed buffers comp_buf_o0 and comp_buf_o1 through the sub-processing circuit 120 of FIG. 1. The application may process the decompressed data.

When the use of the uncompressed buffers uncomp_buf_v0 and uncomp_buf_v1 is completed, the uncompressed buffers uncomp_buf_v0 and uncomp_buf_v1 may be returned to the operating system (OS) according to the free function c_free of code CD6.

Figure 13:
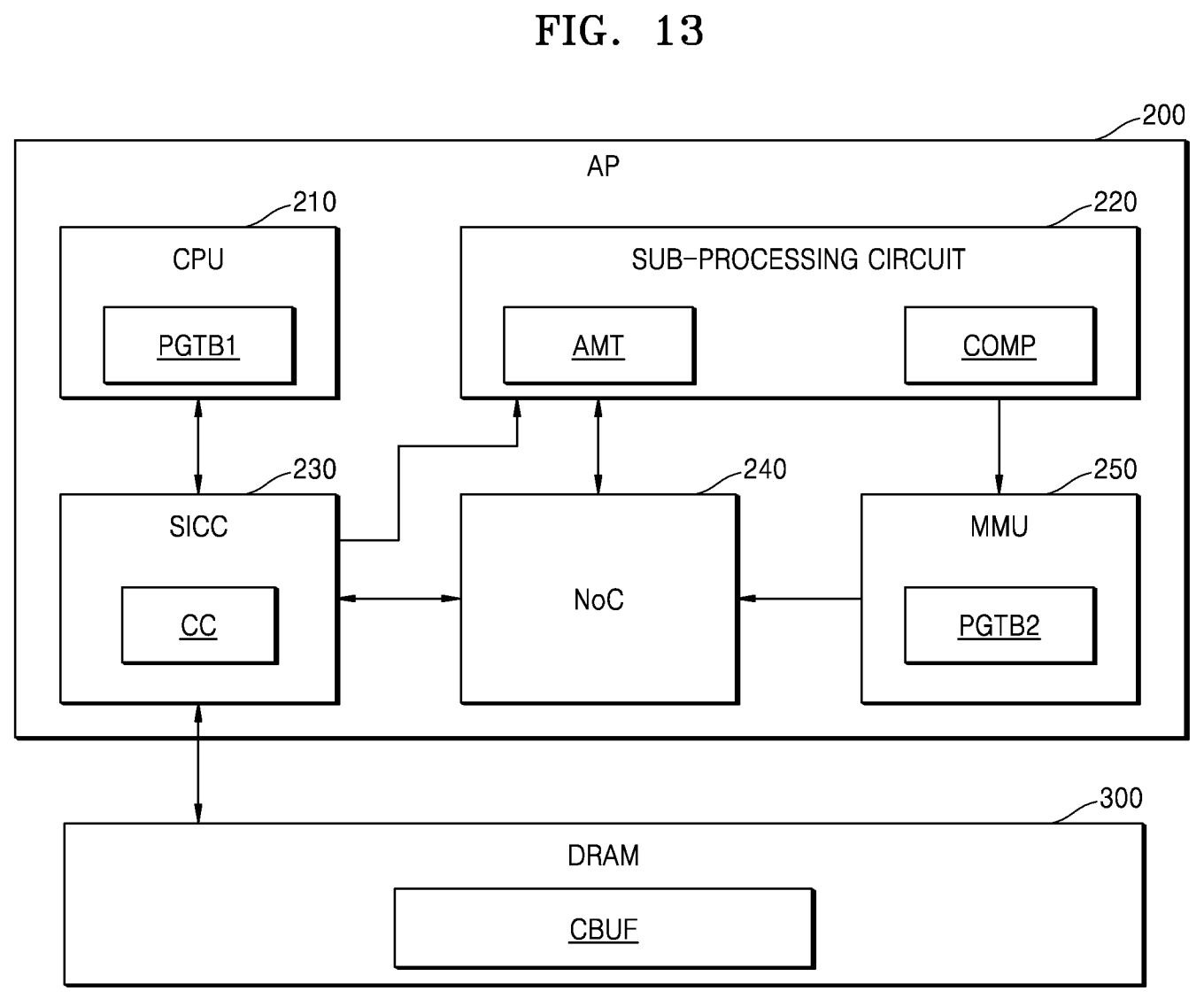

FIG. 13 illustrates an application processor (AP) 200, according to an embodiment.

Referring to FIG. 13, the AP 200 according to an embodiment may include a central processing unit (CPU) 210, a sub-processing circuit 220, a system interconnection circuit (SICC) 230, a network-on-a-chip (NoC) 240, and a memory management unit (MMU) 250. The AP 200 may further include other components, for example, an ISP, a GPU, a communications module, a random-access memory (RAM), or a read-only memory (ROM). The AP 200 may be implemented as a SoC, and data and signals between the components in the chip, such as the CPU 210, the sub-processing circuit 220, the MMU 250, and other processing function blocks, may be transmitted and received through the SICC 230 and the NoC 240. The SICC 230 and the NoC 240 may correspond to the router 161 in the embodiment described above, without limitation thereto. A dynamic RAM (DRAM) may be connected to the AP 200 as a memory of the AP 200. The AP 200 may include a DRAM controller, and the AP 200 may transmit and receive data to and from DRAM under the control of the DRAM controller.

The CPU 210 may be a main processor of the AP 200 to control overall operations of the AP 200, without limitation thereto, and may include one processor core such as a single core processor, or multiple processor cores such as a multicore processor. The CPU 210 may process or execute programs and/or data stored in the RAM, DRAM and/or ROM.

The CPU 210 may correspond to the processor 110 described with reference to FIG. 1. The CPU 210 may execute an operating system and an application, and may convert a virtual address generated by the application into a physical address. Based on the first page table PGTB set for the application, the CPU 210 may convert the virtual address corresponding to the virtual address area, into an effective physical address corresponding to the physical address area of the DRAM 300, or into a shadow physical address corresponding to the shadow physical address area outside of the physical address area of the DRAM 300. The CPU 210 may transmit, to the SICC 230, an access request signal for accessing the DRAM 300, the access request signal may include a physical address, such as an effective physical address or a shadow physical address. The CPU 210 need not support the compression of data that is to be stored in the DRAM 300, nor the decompression of data that is to be read from the DRAM 300. Therefore, when the application requests access to the compression buffer CBUF of the DRAM 300, the CPU 210 may convert the virtual address into the effective physical address based on the first page table PGTB, and the application may have indirect access to the compression buffer CBUF of the DRAM 300 through the sub-processing circuit 220 that supports the data compression and/or decompression. Here, the compression buffer CBUF may store compressed data, such as but not limited to compressed image data.

When the physical address included in the received access request signal is an effective physical address, the SICC 230 may send the access request signal to the DRAM 300. Here, when the physical address is a shadow physical address, the SICC 230 may send the access request signal to the sub-processing circuit 220. When the physical address included in the access request signal received from the CPU 210 is the effective physical address, the SICC 230 may transmit the access request signal to the DRAM 300, and the CPU 210 may have relatively direct access to the DRAM 300 directly through the SICC 230. On the other hand, when the physical address included in the access request signal is the shadow physical address, the SICC 230 may transmit the access request signal to the sub-processing circuit 220, and the CPU 210 may have indirect access to the DRAM 300 via the sub-processing circuit 220.

The SICC 230 may transmit data read from the DRAM 300 to the corresponding processing circuit, such as the CPU 210 and/or the sub-processing circuit 220 that requested access to the data, in response to the access request signal. The SICC 230 may include the cache CC, such as but not limited to a system cache, and may store data read from the memory 300 into the cache CC, or read data from the cache CC in response to a cache management request signal. In addition, the SICC 230 may function as a cache coherency controller that maintains data consistency between local caches and/or shared caches of processing circuits, such as the CPU 210, the sub-processing circuit 220, and other processing circuits without limitation thereto.

The sub-processing circuit 220 may compress or decompress the received data, and may, for example, temporarily store it in the memory 300. The sub-processing circuit 220 may convert the shadow physical address included in the received access request signal into a virtual address matching the effective physical address, such as by using the address matching table (AMT). As described with reference to FIG. 12B, the address matching table AMT may be generated by the compressed API, without limitation thereto. Moreover, the sub-processing circuit 220 may output the cache management request signal to the SICC 230, such as via the NoC 240.

The MMU 250 may convert the virtual address received from the SICC 230, such as via the sub-processing circuit 220, into the effective physical address. The MMU 250 may convert the virtual address into the effective physical address with reference to the second page table PGTB2. In an embodiment, the second page table PGTB2 may be the same as another page table used by other processing circuits, such as by the ISP, the GSP, or the like, that have access to the compression buffer CBUF of the DRAM 300.

The NoC 240 may transmit a request signal that is output from the sub-processing circuit 220 and the MMU 250, such as the access request signal and/or the cache management request signal, to the SICC 230, and may also function as a data path through which the data is transmitted and received between the sub-processing circuit 220 and the SICC 230. The NoC 240 may receive the access request signal including the effective physical address from the MMU 250 and transmit the access request signal to the SICC 230. The NoC 240 may transmit the compressed data, which is read from the compression buffer CBUF of the DRAM 300 based on the access request signal received by the SICC 230 from the MMU 250, to the sub-processing circuit 220. In addition, the NoC 240 may transmit the decompressed data, which is decompressed by the sub-processing circuit 220, to the SICC 230, and the SICC 230, in turn, may transmit the decompressed data to the CPU 210.

Figure 14A:
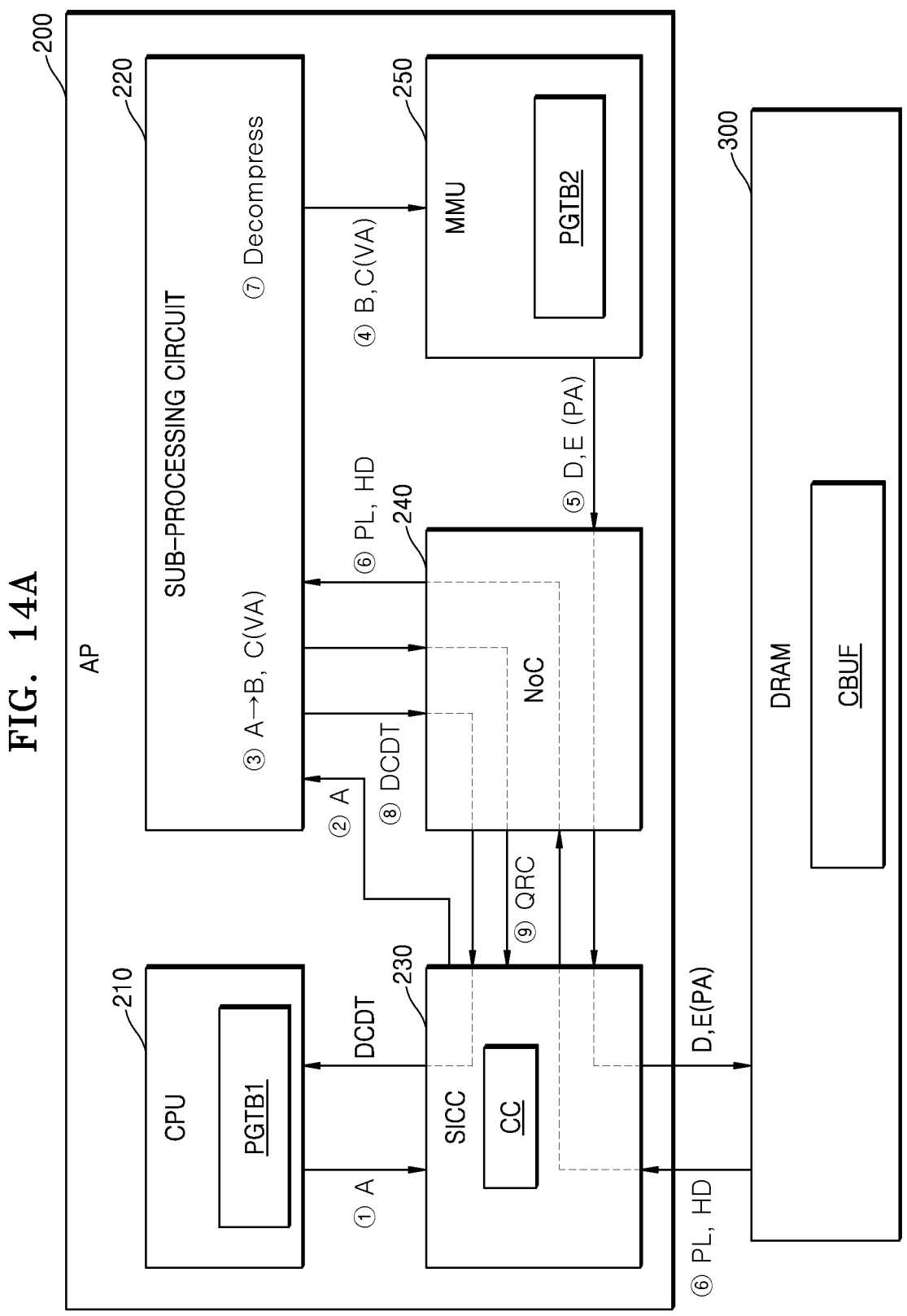
FIGS. 14A and 14B are block diagrams illustrating a read operation and a write operation of the application processor, according to an embodiment.
Figure 14B:
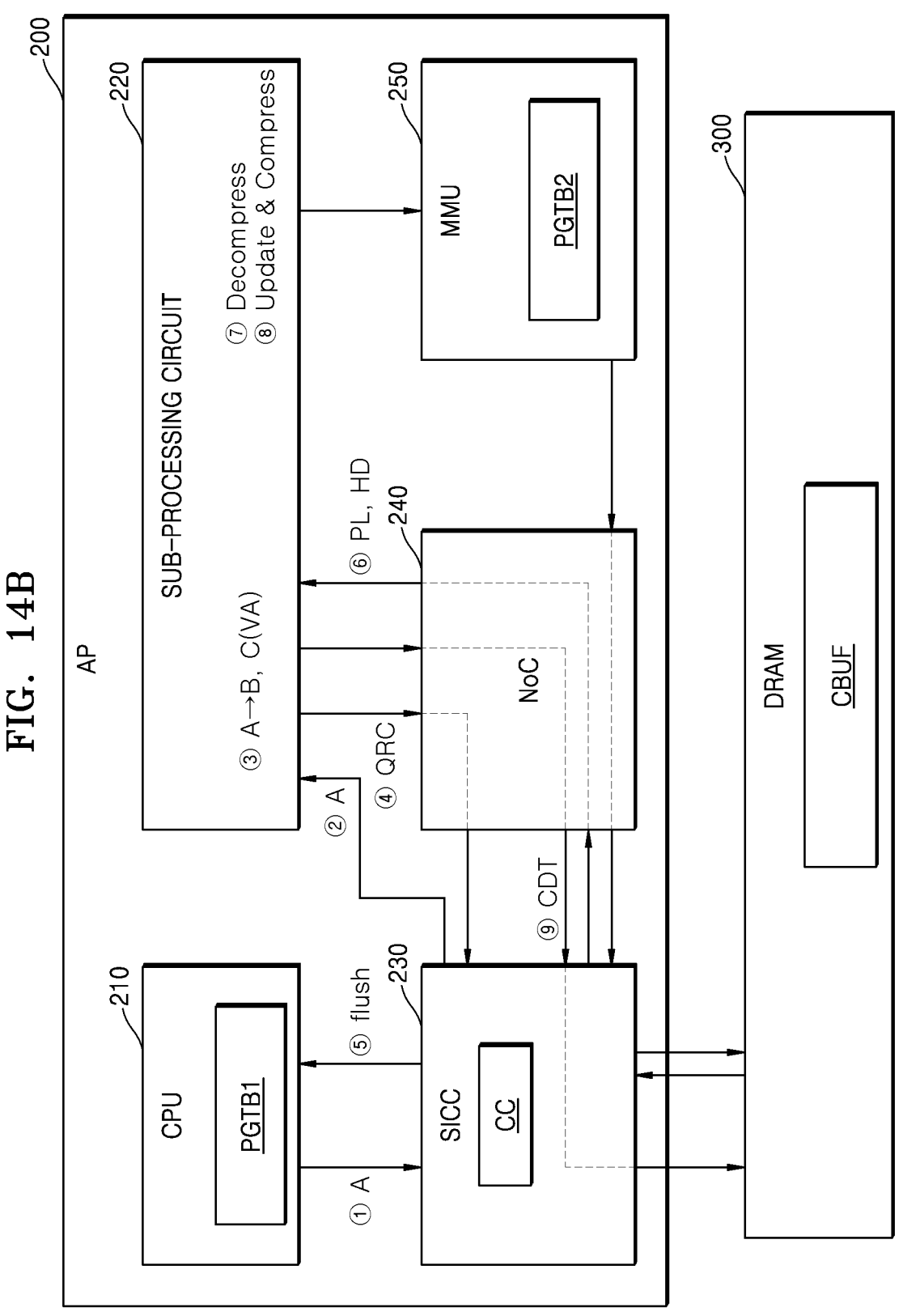

FIGS. 14A and 14B illustrate a read operation and a write operation of the AP 200, according to an embodiment. FIG. 14A shows a process of reading the compressed image data from the compression buffer CBUF of the DRAM 300 by the CPU 210 of the AP 200 in the indirect memory access mode, and FIG. 14B shows a process of writing the compressed image data to the compression buffer CBUF of the DRAM 300 by the CPU 210 of the AP 200 in the indirect memory access mode.

Referring to FIG. 14A, the CPU 210 may output a read request signal including the shadow physical address A to the SICC 230 at operation ①. The read request signal may make a request to read pixel values corresponding to a portion of the image data, such as, for example, at least one area of the image data in a single frame, from the DRAM 300.

The SICC 230 may determine whether the physical address included in the received access request signal is a shadow physical address or an effective physical address, and transmit a read request signal including the shadow physical address A to the sub-processing circuit 220 at operation ②.

The sub-processing circuit 220, in turn, may convert the shadow physical address A into the virtual address VA at operation ③. Moreover, the sub-processing circuit 220 may convert the shadow physical address A into a virtual address B of a header and a virtual address C of a payload of a packet having pixels requested to be read among packets of the compressed image data. The sub-processing circuit 220 may convert the shadow physical address A into the virtual address B of the header and the virtual address C of the payload with reference to the address matching table, such as, for example, AMT of FIG. 15.

FIG. 15 shows an example of the address matching table, according to an embodiment. It may be assumed that the address matching table AMT of FIG. 15 is generated based on the mapping relationship between the virtual address space VAS and the shadow physical address space SPAS in FIGS. 11A and 11B, without limitation thereto.

Referring to FIG. 15, an address matching table AMT according to an embodiment may include the physical address for a decompressed view, that is, a shadow physical address $SPA_S$, a virtual address $VA_{CB}$ corresponding to the shadow physical address $SPA_S$, such as a virtual address of the compression buffer, a header virtual address $VA_{HD}$ and information about image data IF_IMG, such as, for example, a width, a height, a format, or the like of the image data. In an embodiment, the shadow physical address $SPA_S$ indicates a start address of the shadow physical address area and may be referred to as the start address $SPA_S$ hereinafter. For example, a first compressed buffer comp_buf_o0 and a first header address comp_buf_o0+img0_size may be mapped to a first shadow physical address shadow_p0 as the virtual address $VA_{CB}$ and the header virtual address $VA_{HD}$, respectively, and a second compressed buffer comp_buf_o1 and a second header address comp_buf_o1+img1_size may be mapped to a second shadow physical address shadow_p1 as the virtual address $VA_{CB}$ and the header virtual address $VA_{HD}$, respectively. Herein, the mark img0_size of FIG. 15 denotes a first image size of the compressed image data stored in the first compressed buffer comp_buf_o0 that is a type of the virtual address $VA_{CB}$, and the mark img1_size of FIG. 15 denotes a second image size of the compressed image data stored in the second compressed buffer comp_buf_o1 that is a type of the virtual address $VA_{CB}$. In an embodiment shown in FIG. 15, the width, height, and format of first image data and second image data, such as uncompressed or decompressed image data, which is stored in the first shadow physical address shadow_p0 and the second shadow physical address shadow_p1, respectively, may be 3840, 2160, and NV12 in the order listed, without limitation thereto.

Referring back to FIG. 14A, the sub-processing circuit 220 may recognize the start address $SPA_S$ and an offset α from the shadow physical address A, and discover the virtual address $VA_{CB}$ corresponding to the start address $SPA_S$ of the shadow physical address A, the size of the image data, and the information about the image data in the address matching table AMT. For example, when the shadow physical address A indicates a portion of the first shadow physical address area, such as, for example, a sub-block of the image data, the shadow physical address A may be represented as a value obtained by adding the offset α to the first shadow physical address shadow_p0. In this case, the offset α may be smaller than the size of the image data, without limitation thereto. In the address matching table AMT, the sub-processing circuit 220 may find the first compressed buffer comp_buf_o0 as the virtual address $VA_{CB}$ corresponding to the first shadow physical address shadow_p0, the first image size img0_size as the size of image data, the width 3840, the height 2160, and the format NV12 as the information about the image data. The sub-processing circuit 220 may calculate coordinates (e.g., an x coordinate and a y coordinate) of the image data based on the offset α, the format, and the width of the image data in response to the read request of the CPU 210. The sub-processing circuit 220 may calculate the virtual address B of the payload and the virtual address C of the header of the sub-block including pixels designated by the coordinates (x, y) of the image data, based on the first compressed buffer comp_buf_o0 of the virtual address $VA_{CB}$ and the coordinates (x, y) of the image data.

The sub-processing circuit 220 may transmit the virtual address B of the payload and the virtual address C of the header to the MMU 250 at operation ④.

The MMU 250, in turn, may convert the virtual address B of the payload and the virtual address C of the header into the physical address D of the payload and the physical address E of the header with reference to the second page table PGTB2. The physical address D of the payload and the physical address E of the header may be effective physical addresses. In an embodiment, the second page table PGTB2 may include another page table that is referenced by other processing circuits, such as the ISP, the GPU, or the like, for processing the image data in the AP 200. The MMU 250 may transmit read request signals including the physical address D of the payload and the physical address E of the header to the NoC 240, and the NoC 240 may transmit the read request signals to the SICC 230 at operation ⑤. Since the read request signals transmitted from the NoC 240 contain the effective physical address, the SICC 230 may transmit the read request signals to the DRAM 300.

In the compression buffer CBUF of the DRAM 300, the header HD and the payload PL of the compressed image data, which includes pixel values of at least one area of the image data requested by the CPU 210, may be read from the DRAM 300, and may be provided to the sub-processing circuit 220 through the SICC 230 and the NoC 240 at operation ⑥.

The sub-processing circuit 220 may decompress the compressed image data at operation ⑦. The sub-processing circuit 220 may decompress the compressed image data by decoding the payload PL based on compression information in the header HD. The sub-processing circuit 220 may transmit the decompressed image data DCDT to the CPU 210 through the NoC 240 and the SICC 230 at operation ⑧. The decompressed image data DCDT may be used in an application executed by the CPU, without limitation thereto.

In an embodiment, the sub-processing circuit 220 may transmit the cache management request signal QRC to the SICC 230 in relation to the decompressed image data at operation ⑨. For example, the decompressed image data DCDT may include pixel values of a single sub-block having pixel values of at least one area requested by the CPU 210, and the sub-processing circuit 220 may transmit, to the SICC 230, the cache management request signal QRC for requesting to store the remaining pixel values, except for the pixel values provided to the CPU 210, into the cache CC. When the CPU 210 requests reading of continuous pixel values in a single sub-block, a cache hit may occur, and the pixel values already stored in the cache CC may be transmitted to the CPU 210 without any further access to the DRAM 300. Accordingly, the hit ratio of the cache may increase.

In an embodiment, the sub-processing circuit 220 may analyze the read request signals from the CPU 210, check a particular pattern of the image data that is requested by the read request signals, such as a stripe pattern in the image data or the like, and transmit a cache management request signal QRC to the SICC 230 to thereby pre-fetch, from the DRAM 300, image data for which reading is expected to be requested by the CPU 210.

Referring now to FIG. 14B, the CPU 210 may output a write request signal including the shadow physical address A to the SICC 230 at operation ①. The write request signal may indicate a request to write or store pixel values corresponding to a portion of the image data, such as, for example, at least one area of the image data in a single frame, into the DRAM 300.

The SICC 230 may transmit a write request signal including the shadow physical address A to the sub-processing circuit 220 at operation ②. The sub-processing circuit 220 may convert the shadow physical address A into the virtual address VA at operation ③. The sub-processing circuit 220 may convert the shadow physical address A into the virtual address B of the payload and the virtual address C of the header with reference to the address matching table, such as, for example, AMT of FIG. 15. The sub-processing circuit 220 may transmit the cache management request signal QRC to the SICC 230 in relation to a sub-block including the pixel values requested for writing at operation ④. In an embodiment, the sub-processing circuit 220 may transmit a 'clean invalid' request signal to the SICC 230 for the sub-block including the pixel values requested for writing. The SICC 230 may flush dirty lines from the caches for the CPU 210, such as the L1 cache, the L2 cache, the L3 cache, and the last level cache (LLC), and a flushed line may be provided in the cache for the sub-processing circuit 220, such as, for example, the cache CC.

In an embodiment, when no pixel values of the sub-block including the pixel values requested to be written are present in the cache CC, the sub-processing circuit 220 may read the header HD and payload PL corresponding to the sub-block from the compression buffer CBUF of the DRAM 300 at operation ⑥, and decompress the payload PL based on the compression information of the header HD at operation ⑦, such as according to operations ④ through ⑦ of FIG. 14A. The sub-processing circuit 220 may update the sub-block based on the pixel values that are requested to be written by the CPU 210, compress the updated sub-block at operation ⑧, and write the compressed image data CDT, such as the header and the payload of the sub-block on the compression buffer CBUF of the DRAM 300 at operation ⑨.

Figure 16:
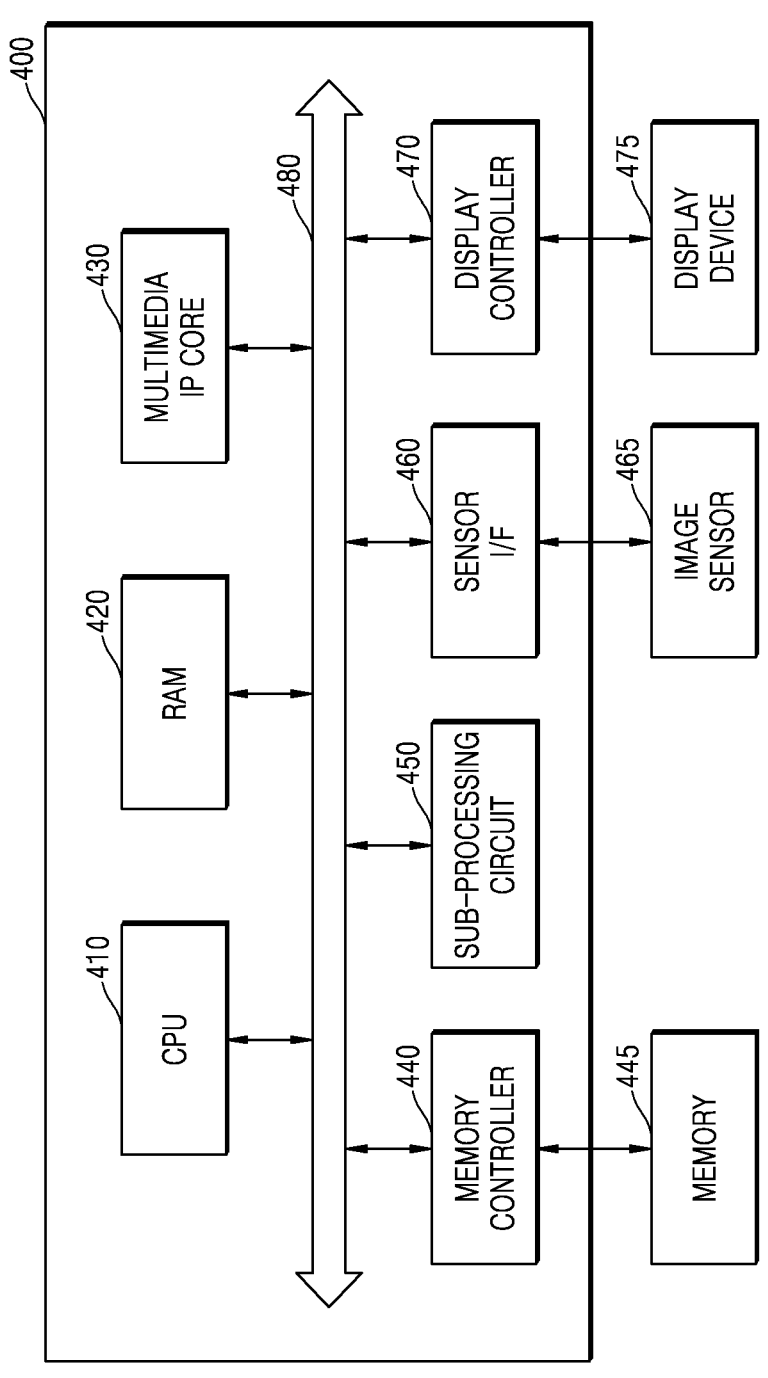
FIG. 16 is a block diagram showing a SoC according to an embodiment.

FIG. 16 shows a SoC according to an embodiment.

Referring to FIG. 16, a SoC 400 according to an embodiment may include a CPU 410, a random-access memory (RAM) 420, a multimedia IP core 430, a memory controller 440, a sub-processing circuit 450, a sensor interface 460, and a display controller 470. The SoC 400 may further include other commonly used components such as a communications module, a read-only memory (ROM), and/or the like. The components of the SoC 400, such as the CPU 410, the RAM 420, the multimedia IP core 430, the memory controller 440, the sub-processing circuit 450, the sensor interface 460, and the display controller 470, may transmit and receive data via a bus 480. The advanced microcontroller bus architecture (AMBA) protocols may be adopted as a standard specification of the bus 480, without limitation thereto. For example, any other suitable protocols, such as uNetwork, CoreConnect, and the open core protocol of OCP-IP may similarly or additionally be adopted into the standard specification. In an embodiment, the bus 480 may be implemented in the form of a network-on-a-chip.

In an embodiment, the bus 480 is further configured to receive another access address from at least one intellectual property (IP) core, and transmit the other access address to the memory if the other access address corresponds to a physical address area of the memory, and to transmit the other access address to other processing circuits other than the memory if the other access address corresponds to a shadow physical address area other than the physical address area of the memory.

The CPU 410 may control overall operations of the SoC 400 and may correspond to the processor 110 of FIG. 1 and/or the CPU 210 of FIG. 13, each as described above. The CPU 410 may execute an operating system and/or an application, and may convert a virtual address generated by the application into a physical address. In this case, based on a first page table set for the application, the CPU 410 may convert the virtual address into one of an effective physical address, which corresponds to the physical address area of a memory 445, and a shadow physical address, which corresponds to the shadow address area outside the physical address area of the memory 445. The CPU 410 may generate an access request signal, such as a read request signal or a write request signal, for accessing the memory 440 that includes the effective physical address or the shadow physical address. The access request signal may be transmitted to the memory controller 440 or to the sub-processing circuit 450 via the bus 480.

The RAM 420 may be implemented as a volatile memory such as dynamic RAM (DRAM) and/or a static RAM (SRAM), and more particularly, as a resistive memory such as PRAM, MRAM, ReRAM, FRAM, or the like. The RAM 420 may temporarily store programs, data, and/or instructions.

The multimedia IP core 430 may perform image processing on the image data, such as, for example, still images or videos. For example, the multimedia IP core 430 may include at least one of an ISP, a GPU, a video processing unit (VPU), a display processing unit (DPU), and/or a neural network processing unit (NPU).

The ISP may change the format of the received image data or correct the image quality of the image data. For example, the ISP may receive RGB image data as input data, and convert the RGB image data into YUV image data. Moreover, the ISP may correct the image quality of the image data by performing image processing such as adjusting a gamma value and/or luminance of the received image data, widening a dynamic range (DR) of the received image data, and/or removing noise from the received image data.

The GPU may calculate and generate two-dimensional or three-dimensional graphics. The GPU may be specialized in processing graphics data and may process graphics data in parallel. Furthermore, the GPU may be used for performing complex operations, such as geometry calculations, scalar and vector floating point calculations, and the like. The GPU may execute various commands that are encoded by using an API, such as but not limited to OpenCL, OpenGL, and/or WebGL.

The VPU may correct the quality of the received video image or record and play images such as recording and playback of audio and video including the video image.

The DPU may perform image processing for displaying the received image data on a display device 475. For example, the DPU may change the format of the received image data to a suitable format for displaying on the display and/or correct the image data based on a gamma value corresponding to the display.

The NPU may perform image processing on the received image data based on the learned neural network, derive features from image data, and recognize objects, backgrounds, or the like in image data based on the features. The NPU may be specialized for computation of one or more neural networks and may process image data in parallel.

The memory controller 440 may interface data or commands between the SoC 400 and the memory 445. The memory controller 440 may receive an access request signal from the bus 480 and transmit the access request signal to the memory 445. As described above with reference to FIG. 1, the memory 445 may be implemented as a volatile memory, such as a DRAM, an SRAM, or an SDRAM, or a nonvolatile memory, such as a PRAM, an MRAM, a ReRAM, a FeRAM, or a NAND flash memory, without limitation thereto. The memory 445 may be implemented as a memory card, such as a multi-media card (MMC), an embedded MMC (eMMC), a secure digital (SD) card, a micro SD card, or the like. The memory 445 may include a compression buffer and may store the compressed image data, without limitation.

The multimedia IP core 430 may compress data processed by the image processing and store the compressed data in the memory 445. The multimedia IP core 430 may include a memory management unit (MMU), and the MMU may convert a virtual address in which the compressed data is stored into an effective physical address, corresponding to the physical address area of the memory 445, based on a second page table that is different from a first page table used by the CPU. Moreover, the multimedia IP core 430 may transmit the access request signal for accessing the memory 445 having the effective physical address to the memory controller 440 via the bus 480.

The sub-processing circuit 450 may support a function that the CPU 410 need not provide, such as, for example, data processing for data read from the memory 445 or data to be written on the memory 445. The sub-processing circuit 450 may convert the shadow physical address in the access request signal transmitted from the CPU 410 into the effective physical address indicating the physical address area of the memory 445, and read data from the memory 445 based on the effective physical address. Accordingly, the CPU 410 may have indirect access to the memory 445 by using the sub-processing circuit 450.

In an embodiment, the sub-processing circuit 450 may convert the shadow physical address into a virtual address by using an address matching table generated together with the first page table when the first page table is created, and may convert the virtual address into the effective physical address by using the second page table set for the multimedia IP core 430. In an embodiment, a system MMU, for converting the virtual address into the effective physical address by using the second page table, may be implemented as a separate circuit from the sub-processing circuit 450. In an embodiment, the MMU of the multimedia IP core 430 may be used as the system MMU.

The sub-processing circuit 450 may correspond to the sub-processing circuit 120 of FIG. 1 or the sub-processing circuit 220 of FIG. 13 as described above, without limitation thereto. Substantially duplicate description of the sub-processing circuit 450 may be omitted.

The sensor interface 460 may interface data or commands between the SoC 400 and the image sensor 465, and may receive the image data from the image sensor 465. The image data received from the image sensor 465 may be processed by at least one processing circuit of the multimedia IP core 430 for image processing, and may otherwise be processed by an application for such image processing running on the CPU 410. The image data received from the image sensor 465, and/or the image data undergoing the image processing, may be stored in the memory 445.

The display controller 470 may interface display data, such as image data, for output to the display device 475. The display device 475 may interpret the display data having images or videos on a display panel, such as a liquid crystal display (LCD) or an active-matrix organic light emitting diode (AMOLED) display, or the like.

Figure 17:
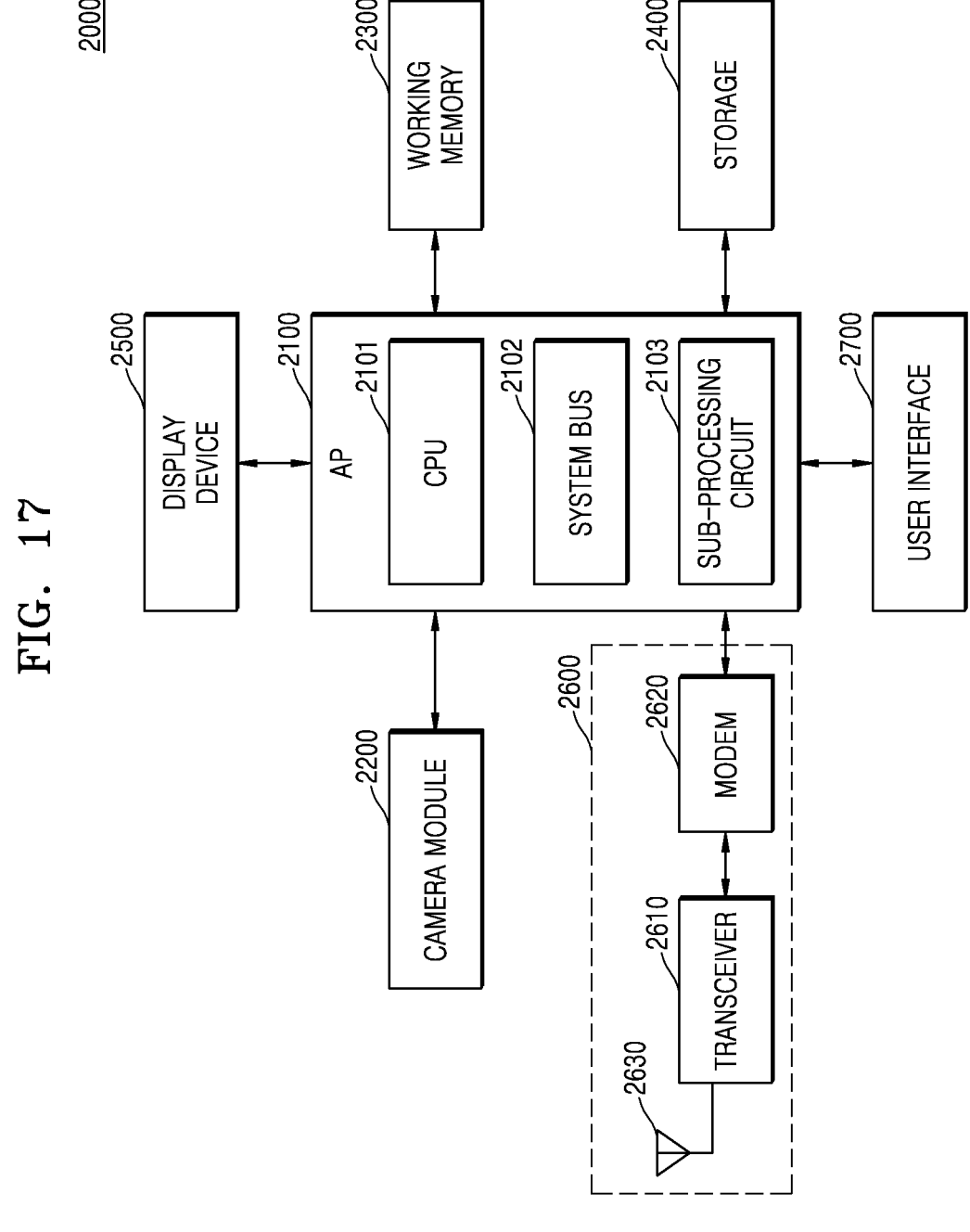
FIG. 17 is a block diagram showing an electronic device on which an application processor is mounted, according to an embodiment.

FIG. 17 shows an electronic device on which an AP is mounted, according to an embodiment.

The electronic device 2000 may include a mobile device, such as a smartphone, a tablet PC, a laptop computer, a wearable device, a GPS device, an e-book terminal, an MP3 player, a digital camera, a navigation device, a drone, an IoT device, a home appliance, an advanced driver assistance system (ADAS), and/or the like. In addition, the electronic device 2000 may be provided as components in assemblies such as vehicles, furniture, manufacturing facilities, doors, and various measurement devices, without limitation thereto.

Referring to FIG. 17, the electronic device 2000 may include an application processor (AP) 2100, a camera module 2200, a working memory 2300, a storage 2400, a display device 2500, a communications module 2600, and a user interface 2700. The electronic device 2000 may further include other commonly used components, without limitation.

The AP 2100 may be implemented as an SoC that controls overall operations of the electronic device 2000 and drives an application program, an operating system, or the like. The AP 2100 may perform image processing on the image data provided from the camera module 2200, and may store the image data in the storage 2400 and/or provide the image data to the display device 2500. The SoC 100 of FIG. 1 and the SoC 100*a* of FIG. 3 and the AP 200 of FIG. 13 and the SoC 400 of FIG. 16, each as described above, may be used as the AP 2100, without limitation thereto.

In an embodiment, the AP 2100 may include a CPU 2101, a system bus 2102, and a sub-processing circuit 2103. When receiving a first access request signal having a physical address for accessing the working memory from the CPU 2101, the system bus 2102 may determine whether the physical address is an effective physical address or a shadow physical address. The system bus 2102 may transmit the first access request signal to the working memory 2300 when the physical address is the effective physical address, and/or to the sub-processing circuit 2103 when the physical address is the shadow physical address. The sub-processing circuit 2103 may convert the physical address in the first access request signal into the effective physical address and transmit a second access request signal having the effective physical address to the system bus 2102. The system bus 2102 may transmit the second access request signal to the working memory 2300 from the sub-processing circuit 2103. In an embodiment, the sub-processing circuit 2103 may perform compression and decompression or encryption and decryption on data received from the CPU 2101 together with the first access request signal, or on data received from the working memory 2300 in response to the second access request signal transmitted to the system bus 2102, and may pre-fetch data from the working memory 2300 that is expected to be accessed by the CPU 2101. The CPU 2101 may have indirect access to the working memory 2300 by using the sub-processing circuit 2103, and the sub-processing circuit 2103 may perform functions that the CPU 2101 need not support, and thus support efficiency of an application running on the CPU 2101.

The camera module 2200, and may generate image data and transmit the image data to the AP 2100. The camera module 2200 may include at least one camera, and the camera may include an image sensor and a lens. The image sensor may convert optical signals received through the lens into the image data. In an embodiment, the camera module 2200 may include multiple cameras having different viewing angles. In an embodiment, the camera module 2200 may generate image data with different exposures and transmit the image data to the AP 2100. The AP 2100 may merge different image data to generate a high dynamic range (HDR) image.

The working memory 2300 may be implemented as a volatile memory such as a DRAM, an SRAM or the like, or a nonvolatile memory such as a FeRAM, a RRAM, a PRAM, a NAND flash memory or the like, without limitation thereto. An operation program or an application program stored in the storage 2400 may be loaded into the working memory 2300 and executed in the CPU 2101. In addition, operating data generated in the operation of the electronic device 2000 may be temporarily stored in the working memory 2300. The working memory 2300 may store programs and/or data processed and/or executed by the AP 2100. For example, the AP 2100 may perform image processing on the image data provided from the camera module 2200, compress the image data processed by the image processing, and temporarily store the compressed image data in the working memory 2300.

The storage 2400 may be implemented as a nonvolatile memory such as a NAND flash and/or a resistive memory, and be provided as a memory card, such as an MMC, an eMMC, a SD, a microSD, or the like. The storage 2400 may store data provided from the AP 2100. For example, the AP 2100 may store the image data processed by the image processing into the storage 2400. In addition, the storage 2400 may store an operation program, an application program, or the like of the electronic device 2000.

The wireless transceiver 2600 may include a transceiver 2610, a modem 2620, and an antenna 2630. The wireless transceiver 2600 may perform wireless communications with one or more external devices, and may receive data from one or more external devices and/or transmit data to one or more external devices.

The user interface 2700 may be implemented with various devices capable of receiving a user input, such as a keyboard, curtain key panel, touch panel, fingerprint sensor, microphone, and/or the like. The user interface 2700 may receive a user input, and provide a signal corresponding to the received user input to the AP 2100.

The inventive concept has been described above by way of example with reference to illustrative embodiments thereof. It shall be understood that embodiments illustrated in the drawings and described in the specification have been provided without limitation thereto. Such embodiments have been described using specific terms in the present specification to efficiently convey the technical ideas of the present disclosure, but shall not be construed to limit the scope or spirit of the present disclosure.

Those of ordinary skill in the pertinent art will appreciate that various modifications and other embodiments are possible, based on the foregoing, without departing from the technical scope of the disclosure. While the inventive concept has been particularly shown and described with reference to illustrative embodiments thereof, it will be understood that various changes in form and details may be made therein without departing from the spirit and scope of the appended claims.

What is claimed is:

1. A System-on-a-Chip (SoC) comprising:
   a first processor configured to output a first access address;
   a system bus configured to transmit the first access address to a memory if the first access address corresponds to a physical address area of the memory, and to transmit the first access address to other processing circuits other than the memory if the first access address corresponds to a shadow physical address area other than the physical address area of the memory; and
   a sub-processing circuit configured to receive the first access address from the first processor via the system bus, convert the first access address into a second access address corresponding to the physical address area, and transmit the second access address to the system bus to access the memory,
   wherein the sub-processing circuit includes:
   a first address conversion circuit configured to convert the first access address into a first virtual address, wherein the first virtual address matches a first physical address corresponding to the physical address area; and
   a second address conversion circuit configured to convert the first virtual address into the first physical address based on a second page table.

2. The SoC of claim 1, wherein the first processor generates one of a first physical address and a second physical address as the first access address based on a virtual address requested from an application with reference to a first page table including mapping information between the virtual address and the first physical address and the second physical address, wherein the first physical address corresponds to the physical address area, and the second physical address corresponds to the shadow physical address area.

3. The SoC of claim 1, wherein the first processor executes an application on an operating system (OS).

4. The SoC of claim 1, further comprising a second processor configured to output a third access address for accessing the memory, wherein the third access address corresponds to a first physical address corresponding to a first physical address area.

5. The SoC of claim 1,
wherein the system bus includes a cache configured to cache data stored in the memory,
wherein the system bus is further configured to receive another access address from at least one intellectual property (IP) core, and transmit the other access address to the memory if the other access address corresponds to a physical address area of the memory, and to transmit the other access address to other processing circuits other than the memory if the other access address corresponds to a shadow physical address area other than the physical address area of the memory, and
wherein the sub-processing circuit transmits a management request signal with respect to the cache, to the system bus in relation to data stored in an address area of the memory corresponding to the second access address.

6. The SoC of claim 1, wherein the sub-processing circuit includes a first function block configured to process data that is received in response to an access request including the first access address.

7. The SoC of claim 6, wherein the first function block includes a compressor configured to compress or decompress the data.

8. The SoC of claim 6, wherein the first function block includes an encoder configured to encrypt or decrypt the data.

9. The SoC of claim 1, wherein
the second page table is the same as a page table used by another processor, which performs data processing, stores processed data in the memory, or reads data from the memory, for converting a virtual address to a physical address of the memory.

10. An application processor comprising:
a main processor configured to convert a first virtual address, which is generated as an application is executed, into a first physical address by using a first page table including mapping information between a physical address, which indicates one of a physical address area and a shadow physical address area of a memory, and a virtual address, which indicates an address area of a virtual memory recognized by the application, and to output a first access request including the first physical address;
a router configured to receive the first access request from the main processor, transmit the first access request to the memory in response to the first physical address corresponding to the physical address area of the memory, and output the first access request to an intellectual property (IP) core other than the memory in response to the first physical address corresponding to the shadow physical address area of the memory;
a sub-processing circuit configured to receive the first access request from the router, process data related to the first access request, and convert the first physical address into a second virtual address; and a first memory management unit (MMU) configured to convert the second virtual address into a second physical address corresponding to the physical address area of the memory,
wherein the router is configured to receive a second access request including the second physical address from the first MMU, and to transmit the second access request to the memory if the second physical address corresponds to the physical address area of the memory.

11. The application processor of claim 10, wherein
the first sub-processing circuit includes a compressor configured to compress or decompress the data.

12. The application processor of claim 10, further comprising:
an image signal processor (ISP) configured to perform image processing on image data, compress the processed image data, and generate a third virtual address of the virtual memory in which the compressed image data is to be stored; and
a second MMU configured to convert the third virtual address into a third physical address corresponding to a compression buffer in which the compressed image data is to be stored among the physical address area of the memory, by using a second page table including mapping information between a physical address, which indicates the physical address area of the memory, and a virtual address, which indicates an address area of the virtual memory recognized by the ISP.

13. The application processor of claim 12, wherein the first MMU is configured to convert the second virtual address into the second physical address with reference to the second page table.

14. The application processor of claim 12,
wherein the router includes a cache configured to cache data stored in the memory, and
wherein the sub-processing circuit configured to transmit a management request signal with respect to the cache, to the router in relation to data stored in an area of the compression buffer corresponding to the second physical address.

15. The application processor of claim 14, wherein the sub-processing circuit is configured to transmit the management request signal to the router to pre-fetch data, which is expected to be requested by the main processor, to the cache from the memory based on a pattern of data for which the main processor requests access.

16. A method of operating a System-on-a-Chip (SoC), the method comprising:
transmitting, by a processor, a first access request signal including a first physical address to a router;
transmitting, by the router, the first access request signal to a sub-processing circuit if the first physical address does not correspond to a physical address area of a memory;
converting, by the sub-processing circuit, the first physical address into a first virtual address;
converting, by the sub-processing circuit, the first virtual address into a second physical address corresponding to the physical address area of the memory based on a second page table;
transmitting, by the sub-processing circuit, a second access request signal including the second physical address to the router; and
transmitting, by the router, the second access request signal to the memory.

17. The method of claim 16, further comprising:

converting, by the processor, a first virtual address to the first physical address based on a page table, wherein the page table includes mapping information between a virtual address and an effective physical address and a shadow physical address, wherein the effective physical address corresponds to the physical address area, and the shadow physical address corresponds to a shadow physical address area other than the physical address area of the memory.

18. The method of claim 16, further comprising:

decompressing, by the sub-processing circuit, compressed data outputted from the memory in response to the second access request signal; and transmitting, by the sub-processing circuit, at least some of the decompressed data to the processor via the router.

19. The method of claim 16, further comprising:

decrypting, by the sub-processing circuit, encrypted data output from the memory in response to the second access request signal; and transmitting, by the sub-processing circuit, at least some of the decrypted data to the processor via the router.

* * * * *